(12) United States Patent
Balemarthy et al.

(10) Patent No.: US 9,709,732 B2
(45) Date of Patent: Jul. 18, 2017

(54) MANUFACTURE OF MULTI-MODE OPTICAL FIBERS

(71) Applicant: OFS Fitel, LLC, Norcross, GA (US)

(72) Inventors: Kasyapa Balemarthy, Hyderabad (IN);
James W Fleming, Westfield, NJ (US);
Jinkee Kim, Norcross, GA (US);
Robert L Lingle, Jr., Johns Creek, GA (US); Roman Shubochkin, Arlington, MA (US); Durgesh Vaidya, Southbridge, MA (US); Man F Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/035,820

(22) PCT Filed: Jan. 30, 2015

(86) PCT No.: PCT/US2015/013655
§ 371 (c)(1),
(2) Date: May 11, 2016

(87) PCT Pub. No.: WO2015/116887
PCT Pub. Date: Aug. 6, 2015

(65) Prior Publication Data
US 2016/0370540 A1    Dec. 22, 2016

Related U.S. Application Data

(60) Provisional application No. 61/934,223, filed on Jan. 31, 2014.

(51) Int. Cl.
*G02B 6/028* (2006.01)
*G02B 6/036* (2006.01)
*G02B 27/00* (2006.01)

(52) U.S. Cl.
CPC ....... *G02B 6/0288* (2013.01); *G02B 6/03627* (2013.01); *G02B 6/03633* (2013.01); *G02B 27/0012* (2013.01)

(58) Field of Classification Search
CPC .......................... G02B 6/0288; G02B 6/03627
See application file for complete search history.

(56) References Cited

U.S. PATENT DOCUMENTS

| 3,904,268 | A | 9/1975 | Keck et al. |
| 6,687,439 | B1 * | 2/2004 | Endo ................. C03B 37/01211 385/123 |
| 7,116,877 | B2 * | 10/2006 | Kuijpers .............. G02B 6/0288 385/123 |
| 7,315,677 | B1 | 1/2008 | Li et al. |
| 7,421,172 | B2 | 9/2008 | Matthijse et al. |

(Continued)

OTHER PUBLICATIONS

Sengupta, "Calculated Modal Bandwidth of an OM4 Fiber and the Theoretical Challenges," Proc. 58th IWCS, pp. 24-29 (Nov. 2009).

(Continued)

*Primary Examiner* — Sung Pak
(74) *Attorney, Agent, or Firm* — Michael J. Urbano

(57) ABSTRACT

Described is a technique for the design and manufacture of MMFs. Designs are implemented so as to limit the maximum variation in $z(r, \lambda)$ with respect to wavelength, where $z(r, \lambda)$ is the dielectric constant weighted by the square of the wavelength. MMFs for use in CWDM applications are specifically described.

16 Claims, 10 Drawing Sheets

(56) References Cited

U.S. PATENT DOCUMENTS

| | | |
|---|---|---|
| 7,421,174 B2 | 9/2008 | Fleming et al. |
| 8,520,994 B2 | 8/2013 | Kim et al. |
| 8,588,568 B2 | 11/2013 | Bookbinder et al. |
| 9,329,335 B2 * | 5/2016 | Balemarthy ......... G02B 6/0288 |

OTHER PUBLICATIONS

Schjaer-Jacobsen et al., "Algorithms for Worst-Case Tolerance Optimization," IEEE Trans. Cir. & Syst., vol. CAS-26, No. 9, pp. 775-783 (Sep. 1979).
Ohashi et al., "Imperfection Loss Reduction in Viscosity-Matched Optical Fibers," IEEE PTL, vol. 5, No. 7, pp. 812-814 (Jul. 1993).
Tajima et al., "Low Raleigh Scattering $P_2O_5$—F—$SiO_2$ Glasses," JLT, vol. 10, No. 11, pp. 1532-1535 (Nov. 1992).

* cited by examiner

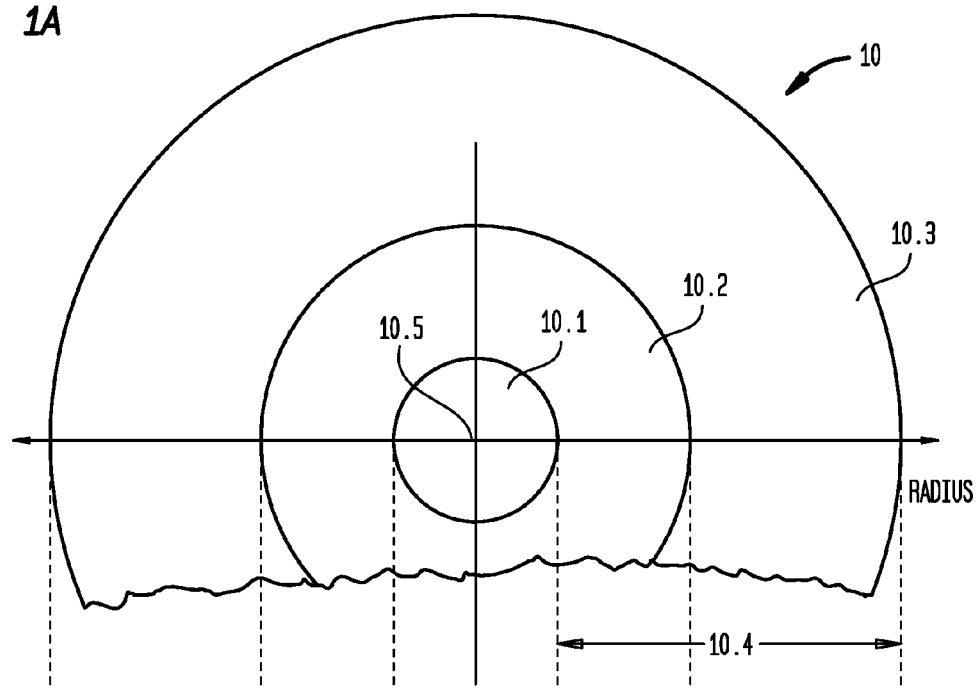
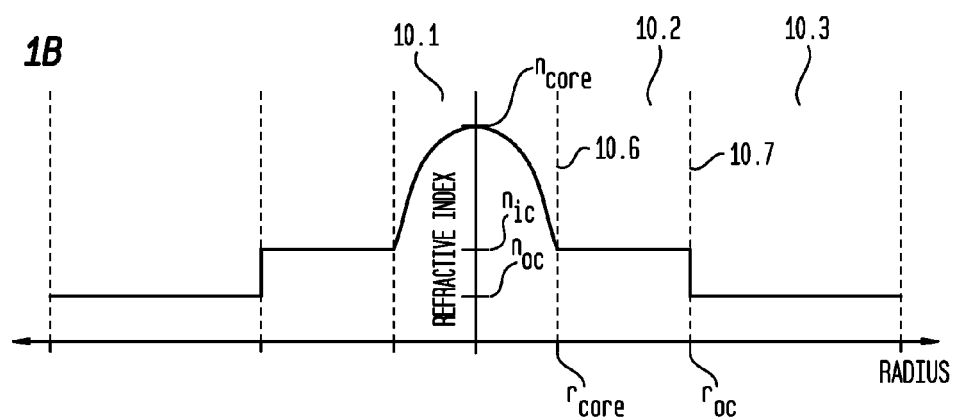
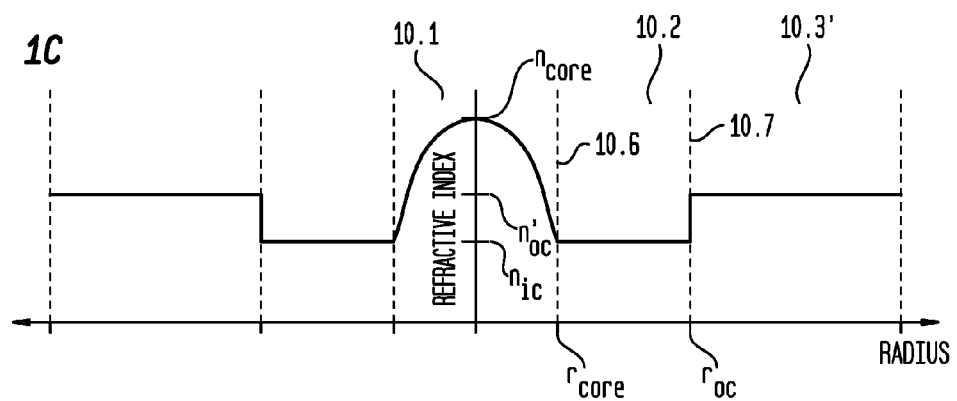

0.2 NA 50 um MMF WITH α=2 MADE WITH -0.0055 DN TUBE

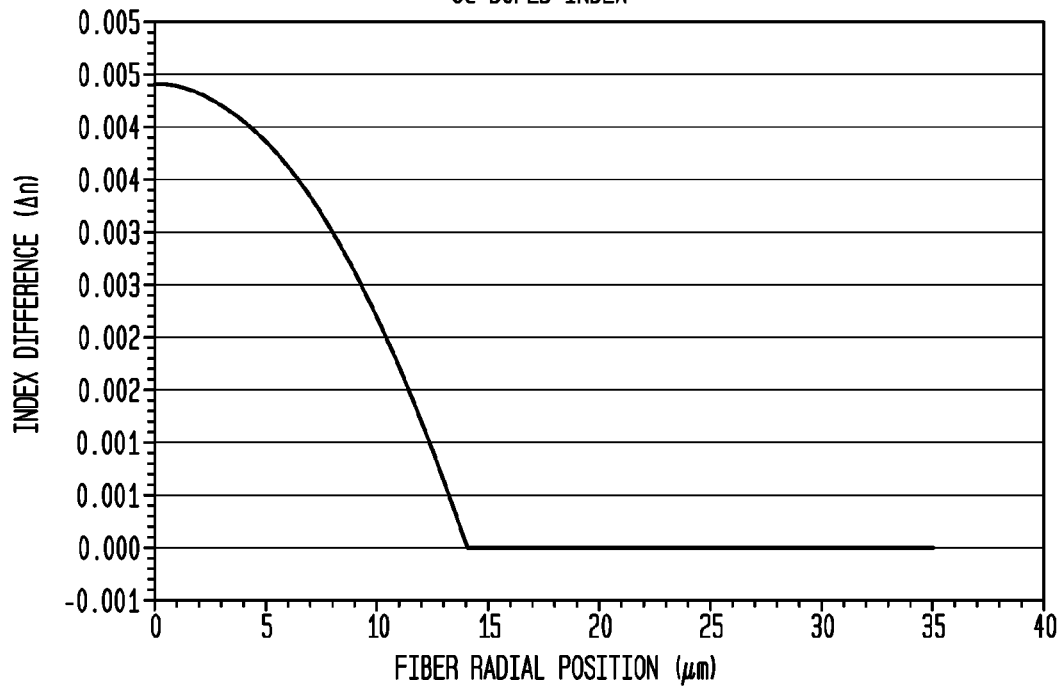
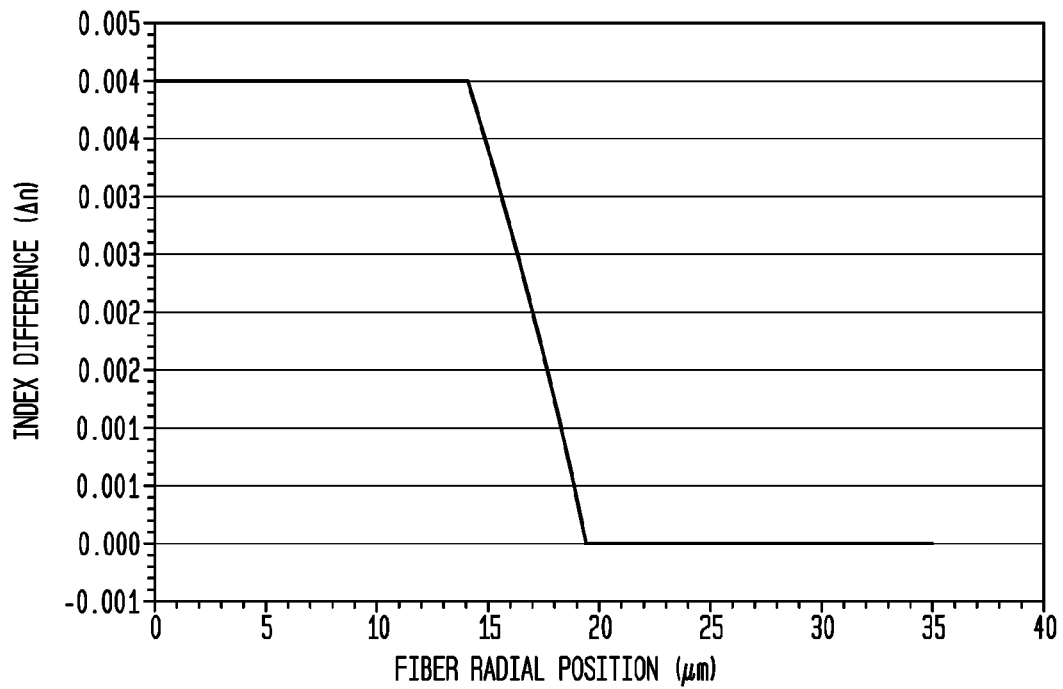

F-DOPED INDEX 0.2 NA 50 um MMF WITH α=2 MADE WITH -0.0055 DN TUBE 0.2 NA 50 um MMF WITH α=2 MADE WITH -0.010 DN TUBE

Ge-DOPED INDEX

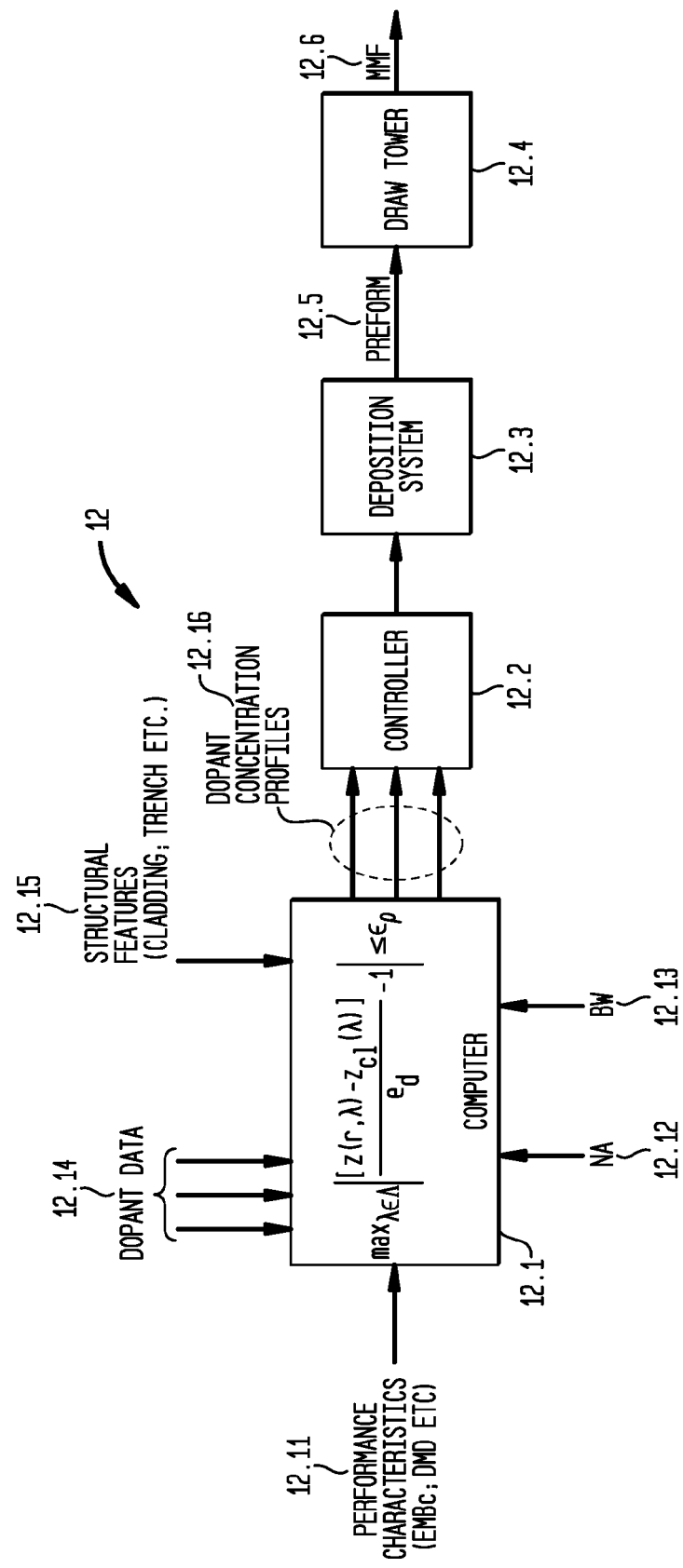

MANUFACTURE OF MULTI-MODE OPTICAL FIBERS

CROSS-REFERENCE TO RELATED APPLICATIONS

This application claims priority from provisional application Ser. No. 61/934,223 filed on Jan. 31, 2014 and entitled "CWDM-optimized MMF."

BACKGROUND OF THE INVENTION

Field of the Invention

This invention relates to multimode optical fibers (MMFs) and, more particularly, to the design and manufacture of such fibers optimized for coarse wavelength division multiplexing (CWDM) applications.

Discussion of the Related Art

As discussed by Fleming et al. in U.S. Pat. No. 7,421,174 (2008), which is incorporated herein by reference, early investigators of MMF designs recognized that a parabolic refractive index profile in the core substantially reduced the intermodal dispersion in the fiber. However, they assumed that this parabolic profile would be optimum and that it would be the same for all transmission wavelengths and fiber compositions. This approach did not take into account the variation in refractive index dispersion in different material compositions from which the fibers were constructed. Around 1975, Keck and Olshansky recognized that the variation in dispersive properties of core and cladding materials in MMFs did affect the optimum profile shape for any wavelength of operation. They described the now standard representation used to calculate the optimum refractive index profile shape in optical fiber in U.S. Pat. No. 3,904,268 issued on Sep. 9, 1975, which is incorporated herein by reference. In this representation the refractive index $n_c(r)$ of the core at any radius, r, less than the core radius, a, is given by $$n_c(r) = n_{c1}[1 - 2\Delta(r/a)^\alpha]^{1/2} \quad (1)$$

where $\Delta = (n_{c1}^2 - n_{c2}^2)/2n_{c1}^2$, $n_{c1}$ and $n_{c2}$ are the refractive indices of the core at r=0 and r=a, respectively, and $\lambda$ is the operating wavelength of the system incorporating the optical fiber as a transmission medium. Prior to recognition of the impact of refractive index dispersion, $\alpha_{opt}$, the optimum value of the profile shape parameter $\alpha$, was expected to be equal to two for all fiber transmission wavelengths.

This approach to MMF design is fraught with several difficulties. First, it requires that $\alpha_{opt}$ be independent of wavelength over the entire operating bandwidth of the fiber. Second, it imposes the shape of the index profile [equation (1)] on the design process a priori.

In addition, Ge-dopant is commonly used to form the near-parabolic index profile in MMFs. While the Ge-doped index profile in MMFs can be optimized (via $\alpha_{opt}$, as above) to achieve a high bandwidth, the high material dispersion of Ge-doped silica limits the spectral width of the high bandwidth region. It is known that both P- and F-doped silica have much smaller material dispersion relative to Ge-doped silica, and fibers made with P- and/or F-dopants have much wider spectral width than conventional Ge-doped fiber. However, it is difficult to introduce a high P-dopant concentration during preform processing because P-doped silica has a high vapor pressure, and a significant fraction of P-dopant is burned off during preform collapse. It is also difficult to maintain a circular preform core containing a high P-concentration because it has much lower viscosity than the surrounding silica, typically a silica substrate tube.

Furthermore, upon exposure to either hydrogen or radiation, fibers containing a high P-concentration have a significantly higher added attenuation, which increases monotonically with the P-dopant concentration. Therefore, it would be desirable to limit the P-concentration in the fiber core.

Thus, a combination of dopants such Ge, P, Al, B, F is required to satisfy both the material dispersion properties imposed by the required CWDM operation as well as to resolve the above manufacturing issues. Typically, MMFs have been analyzed and designed using the so-called "α-profile" where the refractive index profile shape is parabolic. Such a procedure may be too restrictive to achieve effective CWDM-optimized MMFs while at the same time addressing process/manufacturing issues.

BRIEF SUMMARY OF THE INVENTION

In accordance with one aspect of the invention, a broadband multimode optical fiber comprises a core region configured for broadband operation at wavelengths within a predetermined wavelength range Λ, and a cladding region surrounding the core region. The core and cladding regions are configured to support the simultaneous propagation of optical radiation in the core region in a plurality of transverse modes; that is, the fiber is a multimode fiber (MMF). The core region is co-doped with a plurality of dopants, the concentrations and distribution of the dopants being radially varied within the transverse cross-section of the core region so that the refractive index of the core region is radially graded and so that variations in $z(r, \lambda)$ with respect to wavelength are reduced, where $$z(r,\lambda) \triangleq n^2(r,\lambda)k_0^2, \quad (2)$$

$k_o$ is the wave number, $n(r, \lambda)$ is the refractive index profile, and wherein the concentrations and distribution of the dopants are radially varied within the transverse cross-section of the core region so that $$\left| \frac{d[z(r, \lambda) - z_{ci}(\lambda)]}{d\lambda} \right| \leq \epsilon_1 \text{ for } \lambda \in \Lambda \quad (3)$$

where $z_{cl}(\lambda)$ is z of the cladding region, and $\epsilon_1$ is a tolerance factor.

In some embodiments of the invention, broadband MMFs optimized for CWDM applications are made with either pure silica or down-doped silica jackets (i.e., jacket tubes). Down-doped silica jackets have lower refractive index compared to pure silica jackets and permit selective placement of Ge, P, Al, B and F dopants in the core at substantially lower concentrations to effect the following advantageous characteristics: (i) reduced material dispersion, (ii) broadened spectral width of the high bandwidth region for CWDM applications, and (iii) reduced attenuation induced from hydrogen and radiation exposure.

In accordance with another aspect of the invention, a method of manufacturing a broadband MMF comprises the steps of determining the concentration and distribution profiles of the dopants in the core region via equations (2) and (3), and providing those profiles to the inputs of a deposition system that produces an optical fiber preform of the MMF. The preform may then be subject to standard drawing operations to produce a multimode optical fiber.

In accordance with some embodiments of the invention, a method of fabricating an optical fiber comprises the steps of: (i) determining a collection of fiber data including, for example, desired performance characteristics, desired structural characteristics, desired numerical aperture and bandwidth, particular dopants that will be incorporated into the core region; (ii) setting up a numerical optimization code to generate the dopant concentration profiles of each of the dopants by reducing the variation of $z(r, \lambda)$ with respect to wavelength, where $z(r, \lambda)$ is defined by equation (2); and (iii) providing the dopant concentration profiles to a deposition system that produces an optical fiber preform in which the concentration of each dopant in the preform's core region corresponds to the inputted profiles. The desired optical fiber may then be drawn from the preform.

In preferred embodiments of both aspects of the invention, variations in $z(r, \lambda)$ with respect to wavelength are minimized.

BRIEF DESCRIPTION OF THE SEVERAL VIEWS OF THE DRAWING

The invention, together with its various features and advantages, can be readily understood from the following more detailed description taken in conjunction with the accompanying drawing, in which:

FIG. 1A is a partially cut-away view of a schematic, transverse cross-section of a MMF in accordance with an illustrative embodiment of the invention;

FIG. 1B shows an illustrative refractive index profile of another embodiment of the MMF of FIG. 1A along a diameter of the fiber;

FIG. 1C shows another illustrative refractive index profile of one more embodiment of the MMF of FIG. 1A along a diameter of the fiber;

Figure 3A:
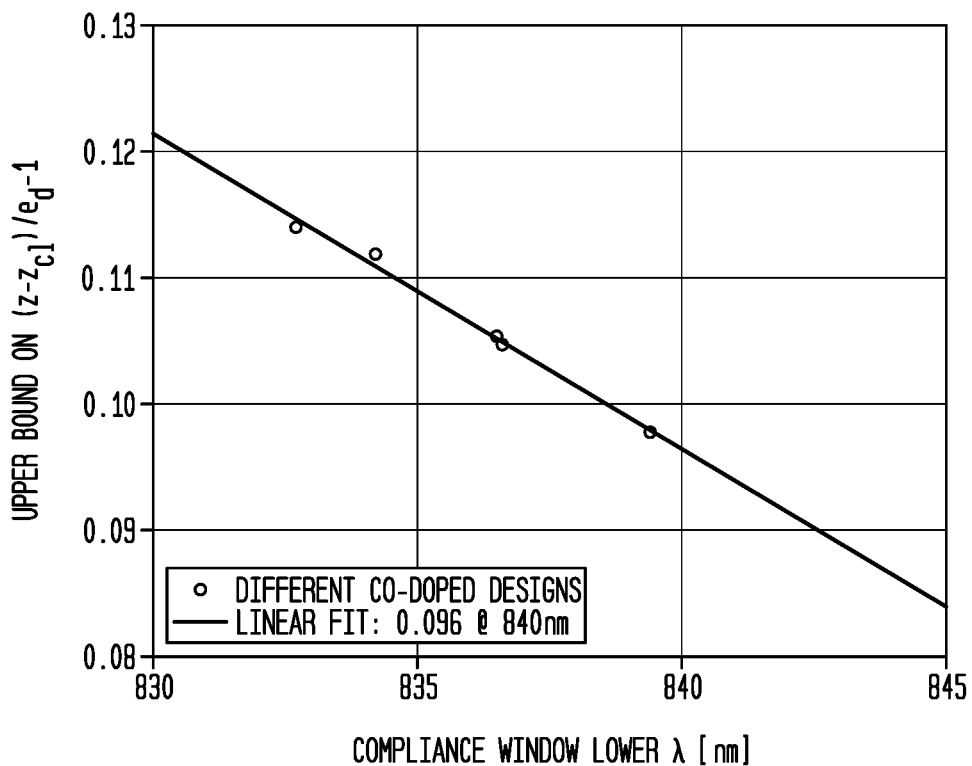
Figure 3B:
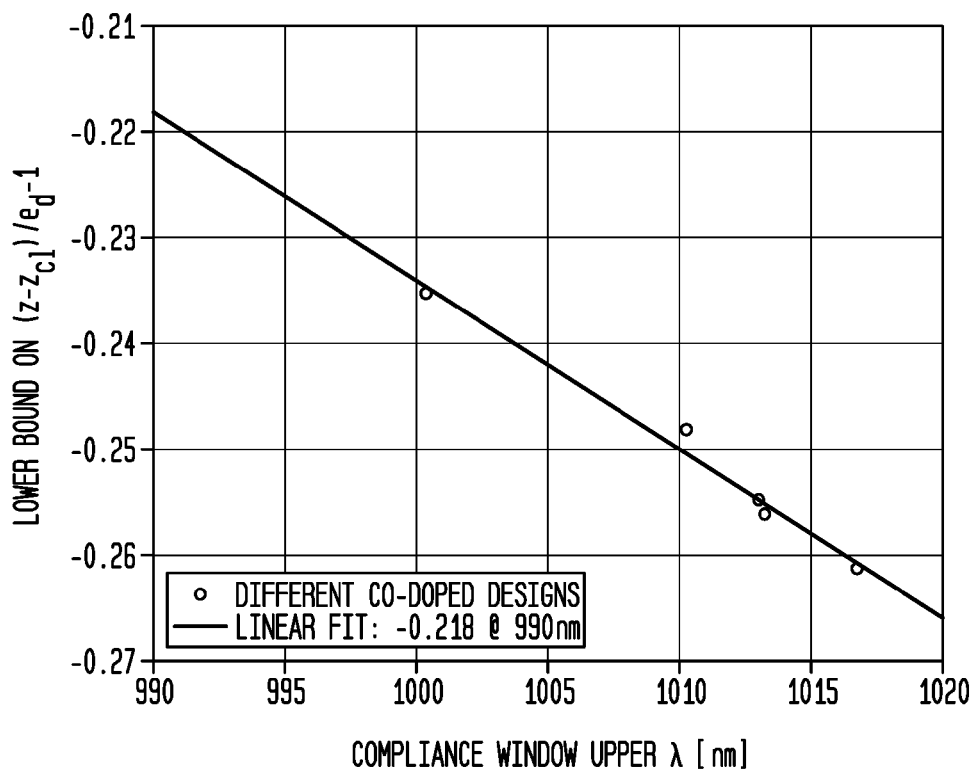
Figure 4:
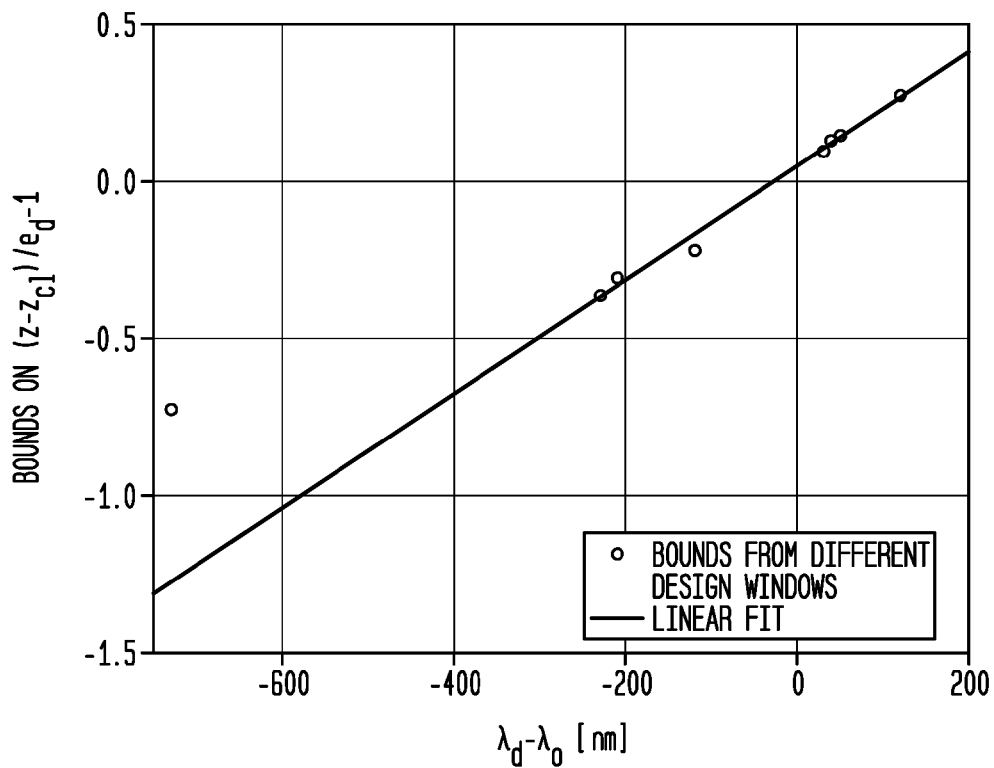
Figure 5:
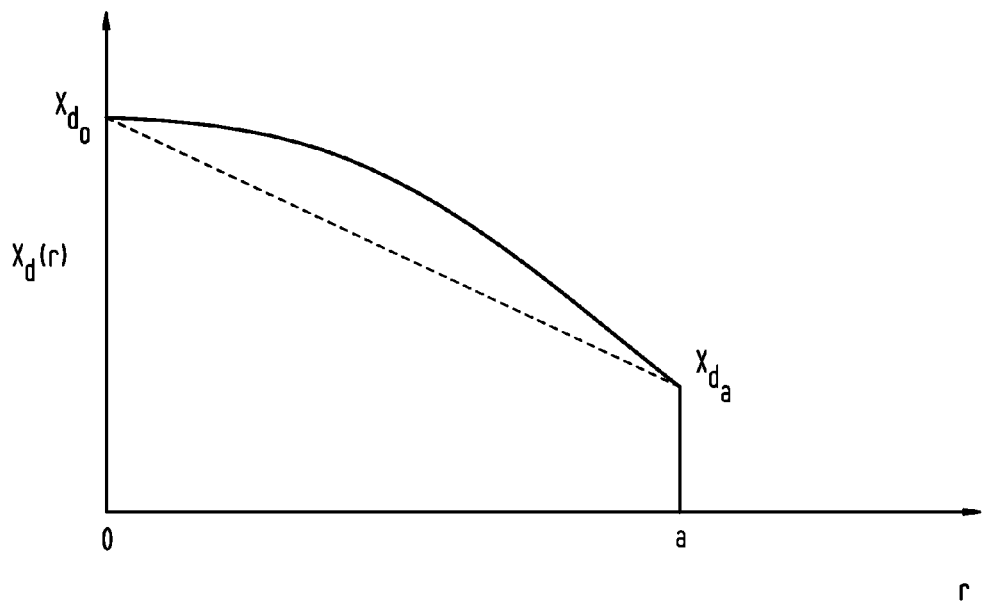
Figure 6:
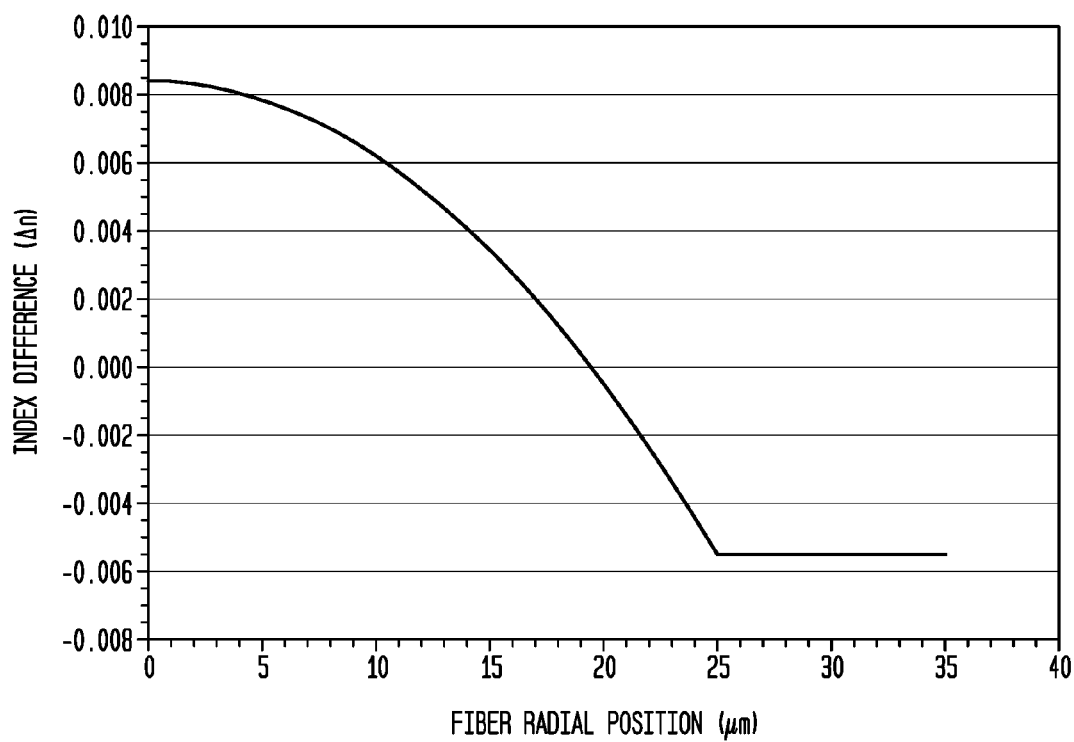
Figure 7C:
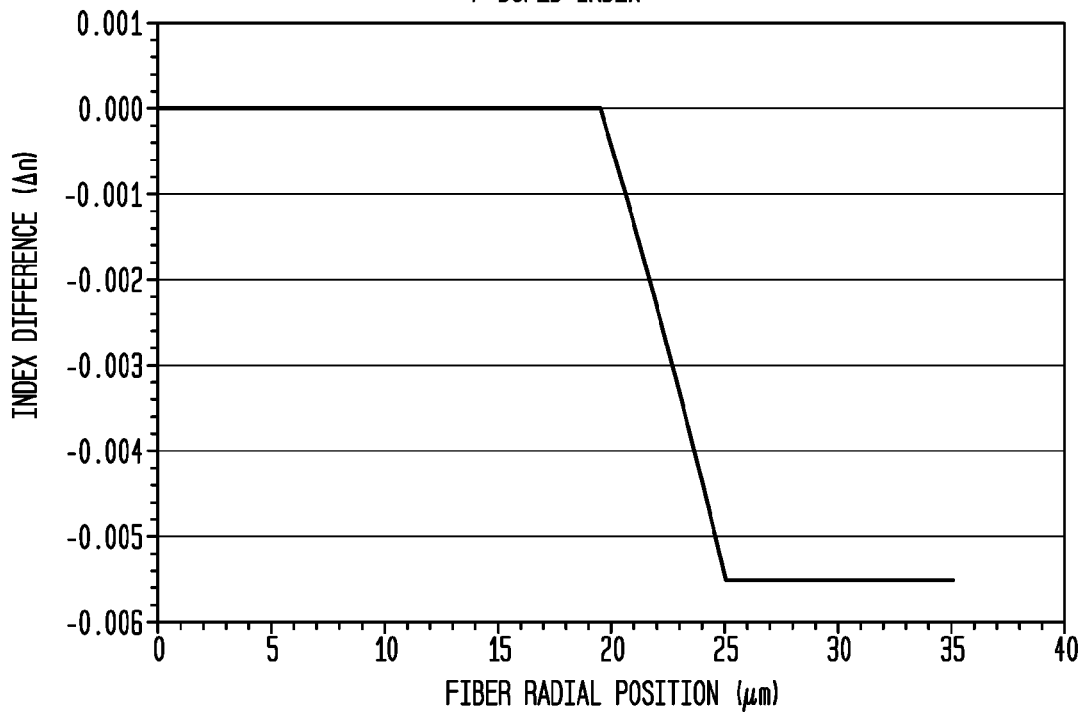
Figure 8:
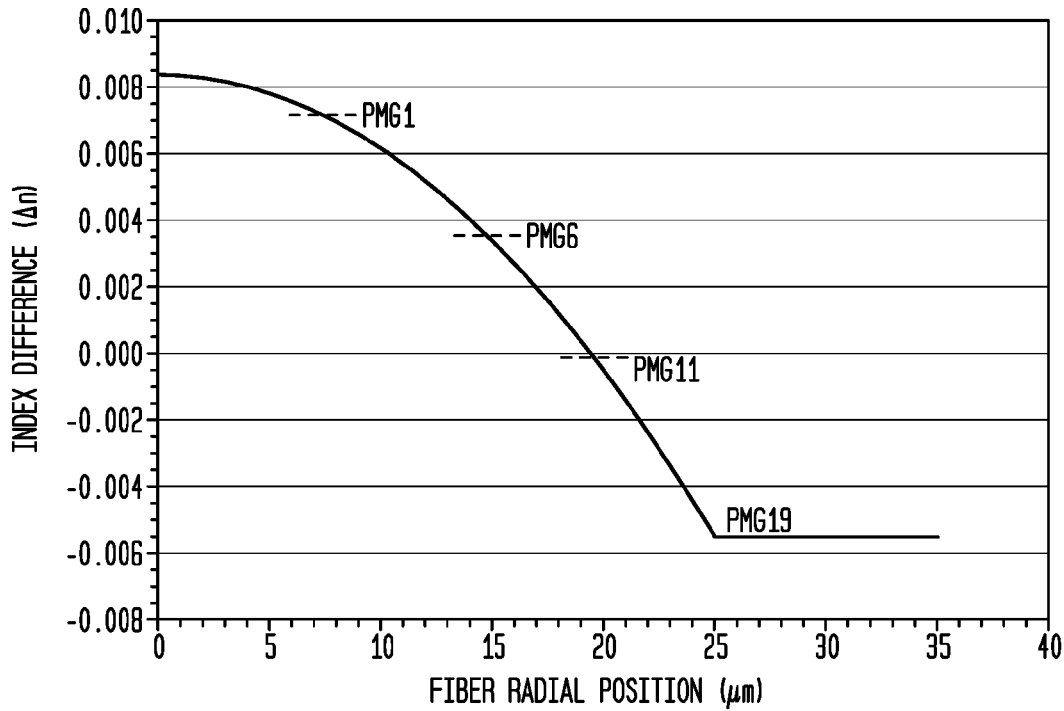
Figure 9A:
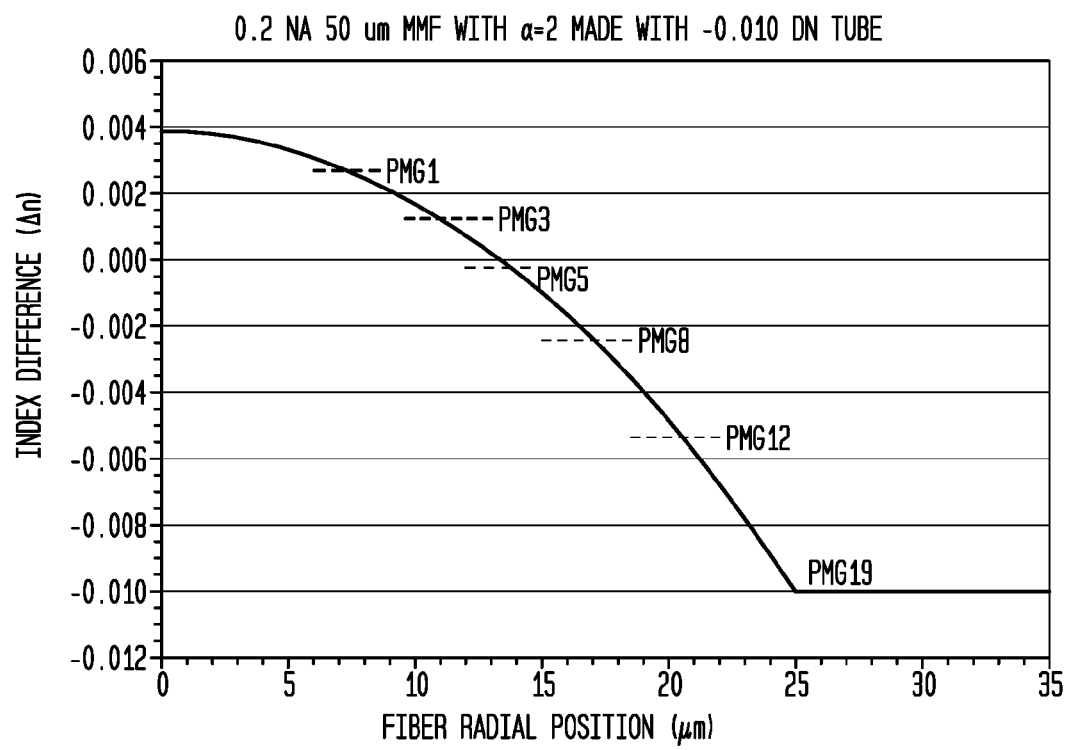
Figure 9B:
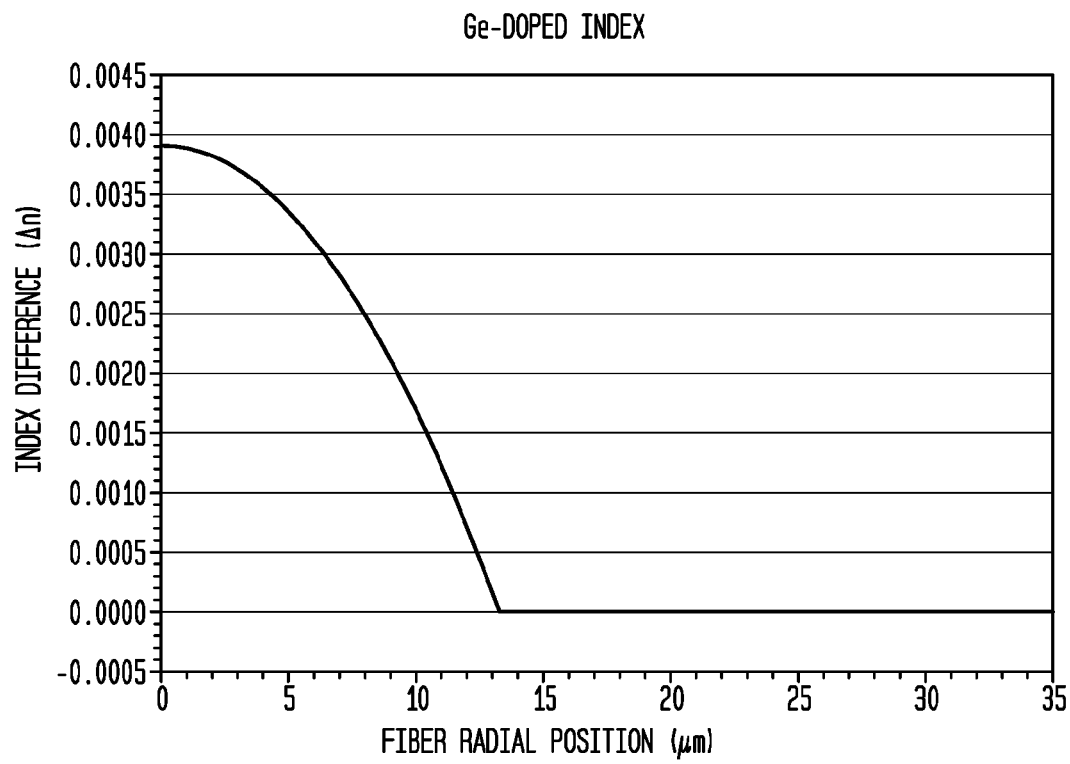
Figure 9C:
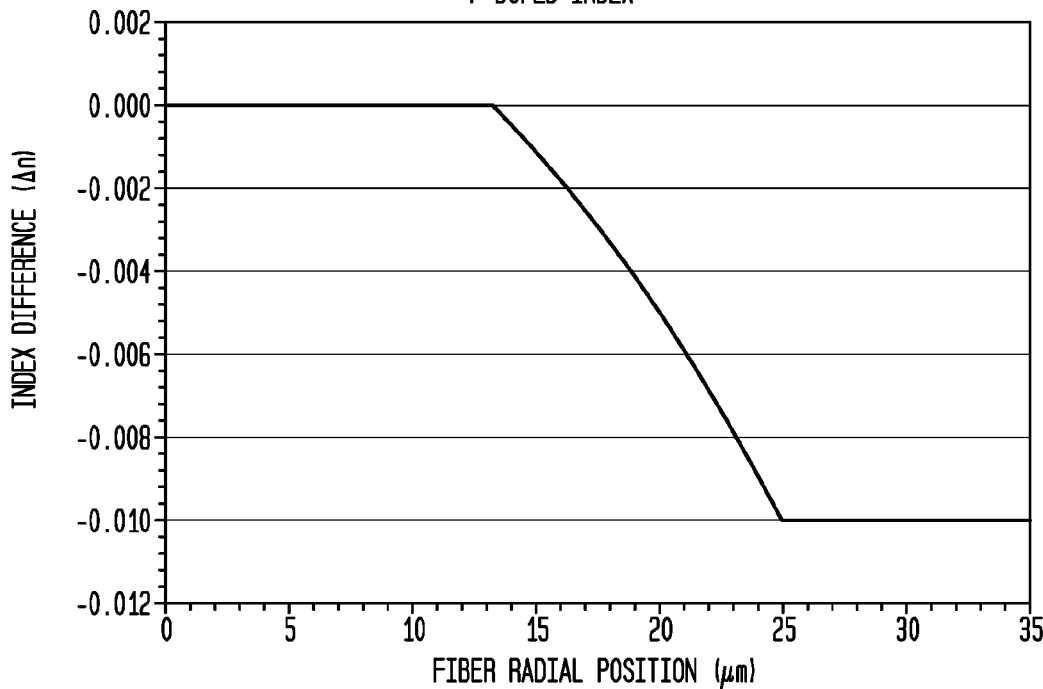
Figure 10A:
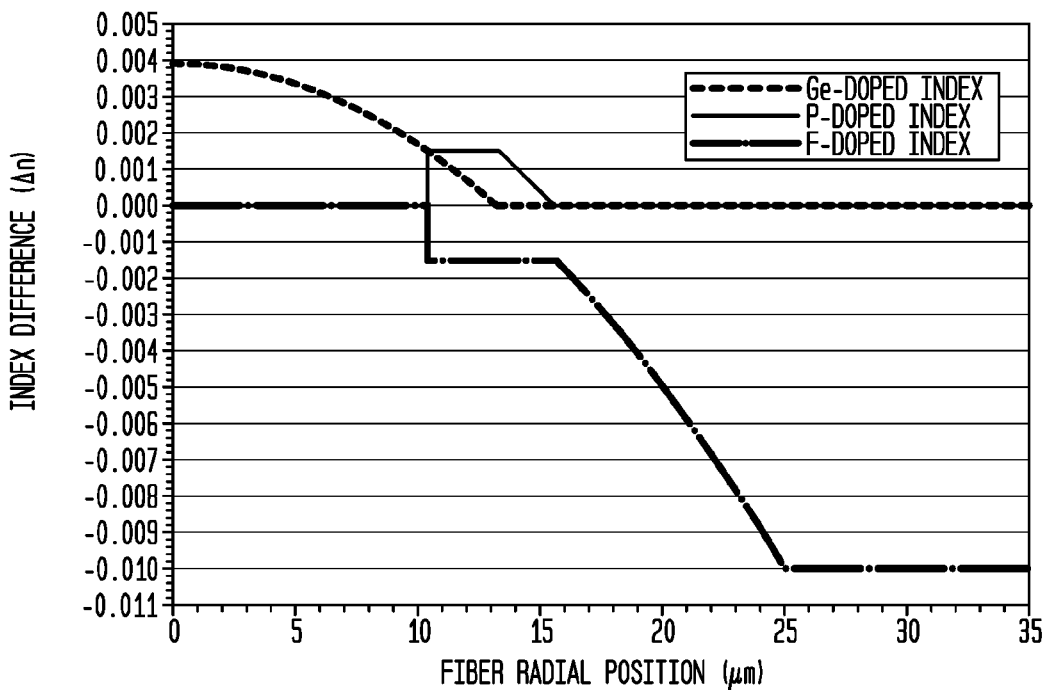
Figure 10B:
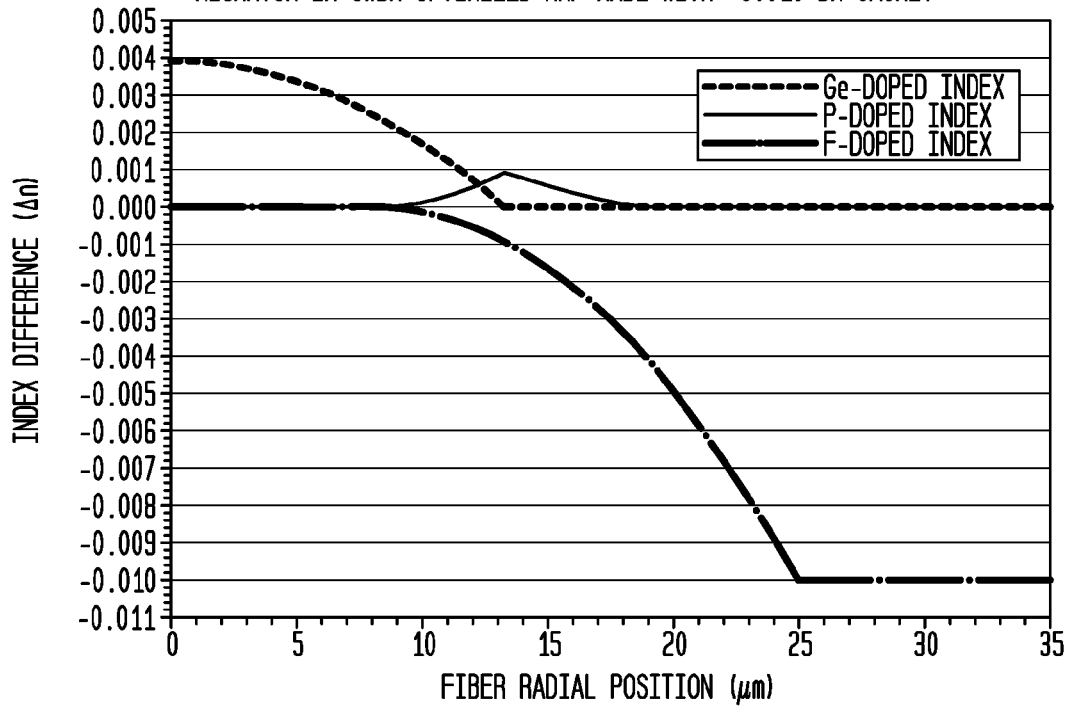
Figure 11:
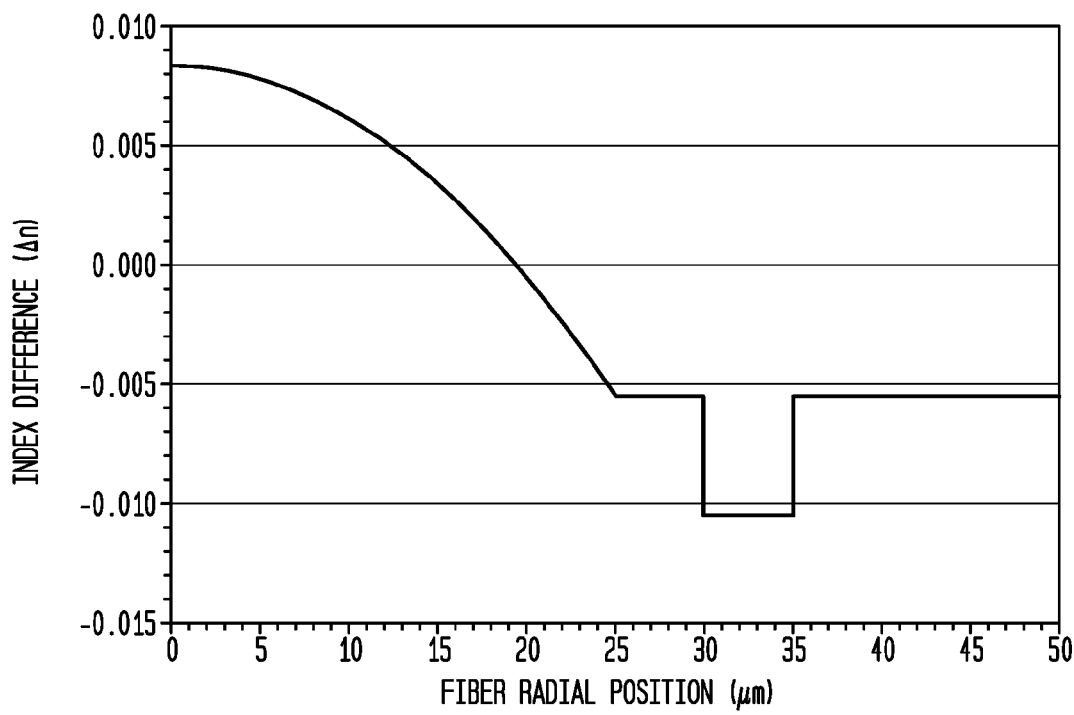

and $n_{clad} = n_{oc}$ or $n_{clad} = n_{oc}'$ in FIG. 1B or FIG. 1C, respectively;

FIGS. 3A & 3B show the upper bound (FIG. 3A) and lower bound (FIG. 3B) on the relative deviation criterion [equation (6)] for an illustrative operating wavelength window of 840-990 nm;

FIG. 4 shows the bounds on the following expression:

$$\frac{[z(r,\lambda) - z_{ci}(\lambda)]}{e_d} - 1$$

as a function of the deviation of the design window wavelength from the internal design wavelength;

FIG. 5 is a graph illustrating how the slope parameter ($\mu$) is chosen;

FIG. 6 is a calculated index profile of a CWDM-optimized MMF with 0.2 NA and 50 μm core diameter inside a jacket tube with $\Delta n = -0.0055$, in accordance with an illustrative embodiment of the invention;

FIG. 7A is a calculated index profile of the Ge dopant in the core region of the CWDM-optimized MMF of FIG. 6 in accordance with an illustrative embodiment of the invention, wherein the MMF illustratively includes a core region doped with Ge, P and F within a low index jacket;

FIG. 7B is a calculated index profile of the P dopant in the core region of the CWDM-optimized MMF of FIG. 6 in accordance with an illustrative embodiment of the invention, wherein the MMF illustratively includes a core region doped with Ge, P and F within a low index jacket;

FIG. 7C is a calculated index profile of the F dopant in the core region of the CWDM-optimized MMF of FIG. 6 in accordance with an illustrative embodiment of the invention, wherein the MMF illustratively includes a core region doped with Ge, P and F within a low index jacket;

FIG. 8 is a calculated graph showing the effective index difference of several principal mode groups (PMGs) at the corresponding index profile of the CWDM-optimized MMF of FIG. 6 in accordance with an illustrative embodiment of the invention, wherein the MMF illustratively includes a core region doped with Ge, P and F within a low index jacket;

FIG. 9A is a calculated index profile of a CWDM-optimized MMF with 0.2 NA and 50 μm core diameter inside a jacket tube with $\Delta n = -0.010$, in accordance with an illustrative embodiment of the invention, wherein the core region is doped with Ge and F;

FIG. 9B is a calculated index profile of the Ge-dopant in the core region of the CWDM-optimized MMF of FIG. 9A in accordance with an illustrative embodiment of the invention;

FIG. 9C is a calculated index profile of the F-dopant in the core region of the CWDM-optimized MMF of FIG. 9A in accordance with an illustrative embodiment of the invention;

FIGS. 10A & 10B show P-dopant addition in the near-zero index region to reduce viscosity mismatch and an excess F-dopant introduced to maintain the target CWDM-optimized index profile. FIG. 10A shows the step profiles of P- and F-dopant profiles, whereas FIG. 10B shows the graded profiles of these dopants. In FIG. 10A the near-zero index region is between approximately 10-15 μm; in FIG. 10B it is between approximately 9-18 μm;

FIG. 11 shows an illustrative index profile of a CWDM-optimized and bend-optimized MMF in accordance with an illustrative embodiment of the invention, wherein a trench has been included in the design; and FIG. 12 is a schematic block diagram used to describe an illustrative optimization technique for implementing the invention in the design and manufacture of a MMF.

Various ones of the foregoing figures are shown schematically in that they are not drawn to scale and/or, in the interests of simplicity and clarity of illustration, do not include all of the details of an actual optical fiber or product depicted.

In addition, in FIGS. 6, 8, 9A and 11 the profile shape parameter is indicated as α=2, which is an illustrative value only. In general, the α may take on a range of values, such as α=2.08±0.1.

GLOSSARY

Bending: Macro-bending, commonly referred to as simply bending, takes place when a fiber is bent, coiled or curled so that its curvature is relatively constant along at least a portion of its length. In contrast, micro-bending takes place when curvature changes significantly within the adiabatic length scale for a particular fiber (e.g., along fiber lengths on the order of a millimeter or less). Such micro-bends are formed, for example, in standard micro-bending tests by pressing the fiber into sandpaper.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Glass Fiber: Optical fiber of the type described herein is typically made of glass (e.g., silica) in which the refractive indices of the core region and of the cladding region are controlled by the amount and type of one or more dopants (e.g., P, Al, Ge, F, Cl) or by hollow voids incorporated therein during the fabrication of the fiber, as is well known in the art. These refractive indices, as well as the thicknesses/diameters of core/cladding regions, determine important operating parameters, as is well known in the art.

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is intended to mean the average index seen by light propagating in that region.

Index Profile: The schematic index profiles (e.g., FIGS. 1B-1C) depict averages of the actual minute variations of index that would be observable in an optical fiber. In addition, although various regions of the index profile may be shown as being rectangular, the boundaries of such regions need not be horizontal or vertical; one or more may be slanted, for example, the region may be trapezoidal or triangular.

Mode: The term mode(s) shall mean the transverse mode(s) of an electromagnetic wave (e.g., signal light, which includes signal light to be amplified in the case of an optical amplifier or the stimulated emission in the case of a laser).

Multimode: The term multimode means the fiber is capable of supporting the propagation of more than one mode simultaneously. Many-moded fibers, as well as few-moded fibers, are both embraced within the scope of the invention.

Radius/Diameter: Although the use of the terms radius and diameter in the foregoing (and following) discussion implies that the transverse cross-sections of the various regions (e.g., core, trench, cladding) are circular and/or annular, in practice these regions may be non-circular; for example, they may be rectangular, elliptical, polygonal, irregular or other more complex shapes. Nevertheless, as is common in the art, we frequently use the terms radius and/or diameter for simplicity and clarity.

Signal Propagation: Although signal light may actually crisscross the longitudinal axis of the fiber as it propagates along a fiber, it is well understood in the art that the general direction of propagation is fairly stated as being along that axis (e.g., axis 10.5 of FIG. 1).

Transverse Cross-Section: The phrase transverse cross-section means a cross-section of fiber in a plane perpendicular to the longitudinal axis of the fiber.

Undoped: The term undoped or unintentionally doped means that a region of a fiber, or a starting tube used to form such a region, may contain a dopant not intentionally added to or controlled in the region during fabrication, but the term does not exclude low levels of background doping that may be inherently incorporated during the fabrication process. The term pure silica means that a silica body (e.g., an outer cladding) is undoped.

DETAILED DESCRIPTION OF THE INVENTION

General Fiber Structure in accordance with some embodiments of the invention, as shown in FIGS. 1A, 1B, & 1C, a multimode, silica optical fiber 10 comprises a relatively high index ($n_{core}$) silicate core region 10.1 surrounded by an annular, lower index cladding region 10.4. The cladding region 10.4 includes an outer cladding region 10.3 (index $n_{oc}$) surrounding an inner cladding region 10.2 (index $n_{ic}$), which in turn surrounds the core region 10.1. Thus, the inner cladding region 10.2 extends from the outer edge 10.6 (at $r=r_{core}$) of the core region 10.1 to the inner edge 10.7 (at $r=r_{oc}$) of the outer cladding region 103. Depending on the design, the outer cladding region 10.3 may have a refractive index that is below that of the inner cladding region 10.2; that is, $n_{oc} < n_{ic}$ (FIG. 1B), or above that of the inner cladding region 10.2; that is, $n_{oc}' > n_{ic}$ (FIG. 1C), or substantially equal to that of the inner cladding region 10.2; that is, $n_{oc}' \sim n_{oc}$ (not shown).

In addition, the refractive index of the core region 10.1 is graded from a maximum ($n_{core}$) at or near its center (longitudinal axis 10.5) to a minimum ($n_{ic}$) at its interface 10.6 with the inner cladding region 10.2. Typically the grading profile is approximately parabolic.

In accordance with some embodiments of the invention, the core region 10.1 comprises silica co-doped with suitable amounts of one or more of the following dopants: P (e.g., a phosphorous oxide such as $P_2O_5$), Ge (e.g., a germanium oxide such as $GeO_2$), Al (e.g., an aluminum oxide such as $Al_2O_3$) and F. In general, $P_2O_5$, $GeO_2$ and $Al_2O_3$ are used to increase the refractive index of silica, whereas F is used to decrease it. Importantly, however, the specific compositions of the co-dopants and their distribution within the core region are determined by application of equations (2) and (3), as described below, to produce a broadband MMF having an NA of approximately 0.2 and a bandwidth of approximately 780-1550 nm.

Framework for Designing Broadband MMFs

The following exposition describes a design approach in accordance with illustrative embodiments of the invention that are applicable to MMFs for use in CWDM systems. It will be apparent to those skilled in the art, however, that the same approach may be readily applied to the design of MMFs for use in other applications.

CWDM operation using MMF over a particular wavelength band, say 780 nm-1550 nm, imposes minimum requirements on the effective modal bandwidth (EMBc) of the MMF at the wavelengths of interest. For example, for OM4 fiber operation, the minimum EMBc=4700 MHz-km, whereas for OM3 fiber operation, the minimum EMBc=3500 MHz-km. Other performance metrics such as differential modal delay (DMD) can also be employed either in conjunction with EMBc or separately. Satisfactory CWDM performance based on these metrics, in turn, depends on the underlying modal structure supported by the MMF—particularly the wavelength dependence of modal properties such as propagation constant, group delays and chromatic dispersion.

Figure 2:
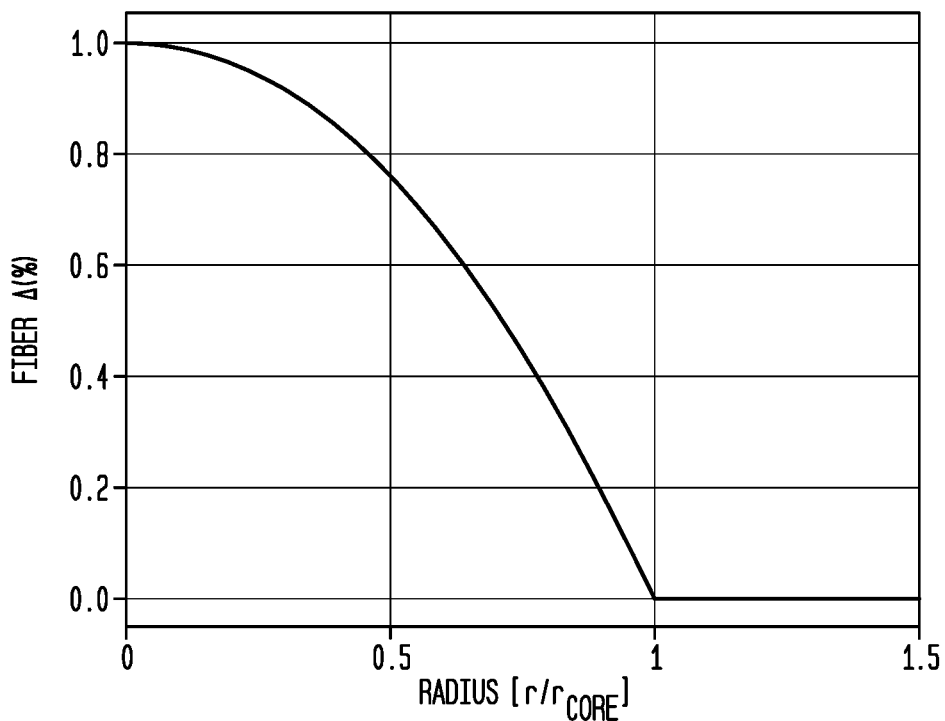
FIG. 2 is a calculated graph of fiber contrast ($\lambda$) for a type α-profile, where $$\Delta = (n_{core}^2 - n_{clad}^2)/(2n_{core}^2);$$

Analysis of the wavelength dependence of these modal properties in the literature has typically relied on the so-called a-profile [equation (1)], where the refractive index is parabolic (FIG. 2). While this method results in optimal index profiles for single wavelength operation, such an approach is too restrictive in designing MMF for CWDM operation. We propose a more general framework based on the light propagation equations.

Light propagation in multimode fiber is governed by Maxwell's equations, which, under the weakly guiding assumption, can be reduced to the scalar wave equation. The mode shapes $F_{l,m}(r, \phi) = R(r)\Phi(\phi)$, characterized by the azimuthal model number (l) and the radial mode number (m), can be then described by the following eigen-equations:

$$\frac{1}{r} \cdot \frac{d}{dr}\left[r\frac{dR(r)}{dr}\right] + \left[n^2(r,\lambda)k_0^2 - \beta^2 - \frac{l^2}{r^2}\right]R = 0 \quad (4)$$

$$\frac{1}{\Phi} \cdot \frac{d^2\Phi}{d\phi^2} = -l^2 \quad (5)$$

$$z(r,\lambda) \triangleq n^2(r,\lambda)k_0^2 \quad (2) = (6)$$

where equation (6) is the same as equation (2) and azimuthal symmetry of the refractive index profile n(r) has been assumed. R(r) and $\Phi(\phi)$ are the radial and azimuthal components of the mode shape, and $k_0 = 2\pi/\lambda$ is the wave number.

Equation (4) is a well-known eigen-value problem that can readily be solved for both the propagation constant ($\beta$) and the radial mode shape (R). Thus, from equations (4)-(6), it follows that $\beta$, its derivatives with respect wavelength $\lambda$ and their variation with wavelength are purely a function of $z(r,\lambda)$, which is related to the refractive index profile and the wave number as defined in equation (6). In other words, variation of modal properties such as phase velocity, group delays and chromatic dispersion with wavelength can be uniquely determined once $z(r,\lambda)$ is known. Therefore, direct control on the wavelength dependence of EMBc (or DMD) can be exercised by controlling the variation of $z(r,\lambda)$ with wavelength.

Based on the above discussion, inventive MMFs for CWDM operation (or other forms of WDM) are designed by reducing (preferably minimizing) the variation of $z(r,\lambda)$ with wavelength. Mathematically, MMFs are designed such that:

$$\left|\frac{d[z(r,\lambda) - z_{ci}(\lambda)]}{d\lambda}\right| \leq \epsilon_1 \text{ for } \lambda \in \Lambda \quad (3) = (7)$$

where equation (7) is the same as equation (3), $\Lambda$ is the desired wavelength range (i.e., the bandwidth) and $\epsilon_1$ is a tolerance factor. Equation (7) is based on the notion that the maximum variation of $[z(r,\lambda) - z_{cl}(\lambda)]$ with respect to wavelength should be limited below a certain value. The outer cladding region has a constant refractive index. Since the guided modes of the fiber are governed by the quantity $[z(r,\lambda) - z_{cl}(\lambda)]$, it follows that the wavelength dependence of this quantity, and not just the wavelength dependence of $z(r,\lambda)$, should be considered.

Note that $\Lambda$ can either be a continuous wavelength range such as 780 nm-1550 nm or a set of discrete wavelengths such as $\{\lambda_1, \lambda_2, \ldots \lambda_N\}$. Alternatively, a small wavelength interval, say 50 nm, centered around a set of discrete wavelengths can be chosen. Note that the contribution of the outer cladding, $z_{cl}(\lambda)$, has been subtracted out in equation (7) because the modes that propagate (without significant loss) have an effective index higher than the outer cladding index. The term $[z(r,\lambda) - z_{cl}(\lambda)]$ serves the purpose of a potential well from the perspective of mode propagation.

Alternatively, we can apply the min-max criterion to $[z(r,\lambda) - z_{cl}(\lambda)]$ itself; i.e., $$\text{maximum}_{\lambda \in \Lambda} |[z(r,\lambda) - z_{cl}(\lambda)] - e_d| \leq \epsilon_2 \quad (8)$$

where $\epsilon_2$ is another tolerance factor, which is not necessarily equal to $\epsilon_2$. In well-known optimization principles, min-max criterion implies that the maximum value of some objective function is to be minimized. In other words, the maximum deviation of $[z(r,\lambda) - z_{cl}(\lambda)]$ from a desired value ($e_d$) over the wavelength range of interest needs to be upper-bounded. Similarly, those skilled in the art can readily employ a variety of optimization criteria whose essential guiding principle is to limit the wavelength variation of $[z(r,\lambda)) - z_{cl}(\lambda)]$. The present invention subsumes all of those criteria. Min-max criteria are well known in art of solving worst-case problems. See, for example, Schjaer-Jacobsen et al., "Algorithms for Worst-Case Tolerance Optimization," IEEE Trans. Circuits and Systems, Vol. CAS-26, No. 9, pp. 775-783 (1979), which is incorporated herein by reference.

Furthermore, we can use relative deviations in $[z(r,\lambda) - z_{cl}(\lambda)]$ across a wavelength range $\Lambda$ as an optimization criterion:

$$\text{maximum}_{\lambda \in \Lambda} \left|\frac{[z(r,\lambda) - z_{ci}(\lambda)]}{e_d} - 1\right| \leq \epsilon_p \quad (9)$$

One choice for the desired $e_d$ can be $e_d = [z(r, \lambda_d)) - z_{cl}(\lambda_d)]$, where the design wavelength $\lambda_d$ is appropriately chosen to be within the operational wavelength range $\Lambda$ and $\epsilon_p = \epsilon_2/e_d$.

Equation (9) arises from normalizing equation (8) with respect to the quantity $e_d$. Assume the fiber is optimized at one wavelength $\lambda_d$; that is, the dopant profiles of the core region dopants are chosen so that the fiber has the best possible performance (e.g., EMBc, DMD etc) at this wavelength. The normalization indicated by equation (9) implies that only deviations in $[z(r,\lambda) - z_{cl}(\lambda)]$ with respect to $e_d = [z(r, \lambda_d) - z_{cl}(\lambda_d)]$ would be of concern. Such normalization simply allows the metric $\epsilon_p$ to be as independent of material properties as possible. In contrast, the metric $\epsilon_2$ without normalization [equation (8)] depends on the material properties at $\lambda_d$ as can be seen from $\epsilon_p = \epsilon_2/e_d$.

The particular values for the optimization parameters $\epsilon_1$, $\epsilon_2$ or $\epsilon_p$ depend on the desired operational wavelength range $\Lambda$ as well as the required fiber performance. For example, the modal bandwidth or differential modal delay (DMD) can be constrained to be OM4 or OM3 compliant. A simpler metric can be the RMS pulse-width or the worst-case group delay across the propagating modes. For example, $e_d$ can be chosen such that the reference index profile at the reference wavelength $\lambda_d$ [i.e., $n(r,\lambda_d)$] results in the desired transmission and bandwidth (e.g., DMD) performance at $\lambda_d$. Furthermore, $\epsilon_1$ and $\epsilon_2$ are chosen such that the fiber has a desired transmission and bandwidth (e.g., DMD) performance within the operating wavelength range, $\lambda$.

In accordance with an illustrative embodiment of the invention, the relative deviation criterion [equation (9)] is used to establish typical values for $\epsilon_p$. For this purpose, four illustrative wavelength windows are chosen: 840-990 nm, 840-1120 nm, 1000-1330 nm and 780-1550 nm. Various fiber designs that use different combinations of dopants, including down-doped outer cladding designs are analyzed. Each design that is compliant may have an actual operational wavelength range slightly wider than the desired wavelength window. For each design, both the upper and lower bounds on $$\frac{[z(r,\lambda) - z_{ci}(\lambda)]}{e_d} - 1$$

are estimated for compliance.

FIGS. 3A & 3B show the upper and lower bounds, respectively, on the relative deviation criterion, equation (9), for the operational wavelength window 840-990 nm for OM4 grade MMF. The upper and lower bounds linearly track the wavelength window limits, independent of the dopant mix including whether down-doped outer cladding designs are employed or not. From this observation, the appropriate value for $\in_p$ can be estimated via a linear curve-fit. While the fit is shown only for the 840-990 nm design window, the same characteristic for the three remaining design windows have been observed as well. The values for these upper and lower bounds for all the design windows are given in Table 1.

TABLE 1

| Design Window | Upper Bound on $\dfrac{[z(r,\lambda)-z_{cl}(\lambda)]}{e_d} - 1$ | Lower Bound on $\dfrac{[z(r,\lambda)-z_{cl}(\lambda)]}{e_d} - 1$ |
| --- | --- | --- |
| 840-990 nm | 0.096 | −0.218 |
| 840-1120 nm | 0.147 | −0.362 |
| 1000-1330 nm | 0.276 | −0.305 |
| 780-1550 nm | 0.131 | −0.724 |

The fiber design process employed an internal design wavelength $\lambda_d$ that could be anywhere within the design window, $\Lambda=[\lambda_L, \lambda_U]$, where $\lambda_L$ and $\lambda_U$ are the lower and upper extreme wavelengths, respectively. It can be shown that the upper and lower bounds shown in Table 1 depend on the $\lambda_d-\lambda_L$ and $\lambda_d-\lambda_U$, respectively. For the design windows discussed, a linear model proves sufficiently accurate, as shown in FIG. 4. Therefore, one embodiment of the present invention uses the following criterion to set the bounds $\in_p$ on the relative deviation criterion, equation (9);

$$\in_p = 0.0018(\lambda_d - \Lambda_0) + 0.0496 \quad (10)$$

where $\lambda_0$, the design window wavelength is either $\lambda_L$ or $\lambda_U$. Equation (10) is the linear curve-fit shown in FIG. 4. A more general and explicit form of the metric $\in_p$ can be adopted as follows:

$$\in_{p,L} = a_1(\lambda_d - \lambda_L) + a_0, \in_{p,U} = a_1(\lambda_d - \lambda_U) + a_0, \in_p = \min(|\in_{p,L}|, |\in_{p,U}|) \quad (10a)$$

where $0 \le a_1 \le 0.0025$, $0 \le a_0 \le 0.05$.

The objective of the design process is to arrive at a set of dopant concentrations (e.g., mole fractions) at each radius r such that the optimization criteria in equations (7)-(9), or any of its variations, is satisfied. In order for the resulting designs to be practical, additional continuity constraints are imposed on the individual dopant concentrations as a function of radius r. For example, the maximum slope ($\mu$) of the dopant concentration from one point to another can be constrained as follows:

$$\left|\frac{dX_d(r)}{dr}\right| \le \mu \text{ for } r \in \mathbb{R} \quad (11)$$

where $X_d(r)$ is the dopant concentration at a radius r and R is the range of radii being considered (e.g., for the core region, $0 \le r \le r_{core}$). Again, alternative mathematical expressions for realizing the continuity constraints [e.g., a finite-difference approximation to implement equation (11)] are subsumed in this invention.

Continuity Constraint Parameter $\mu$

Various methodologies can be adopted to choose the continuity constraint parameter $\mu$. One approach begins by assuming that the dopant under consideration will be used exclusively to achieve the numerical aperture requirements, while accounting for a down-doped outer cladding region. (Similar approaches apply to other designs such as up-doped outer cladding regions and undoped outer cladding regions.) Using the numerical aperture and the illustrative down-doping requirement, it is readily possible to determine the dopant concentrations at the fiber axis and at the interface between the core and inner cladding regions.

In any case, dopant concentration at the fiber axis (r=0) and at the core/inner cladding interface (r=a) are denoted by $X_{d_0}$ and $X_{d_a}$, respectively, as shown in FIG. 5. Therefore, the maximum possible slope for the dopant concentration across the core is:

$$\mu = \gamma \left|\frac{X_{d_0} - X_{d_a}}{a}\right|, \gamma = 0.5 - 2.5 \quad (12)$$

where $\gamma$ is an arbitrary scaling parameter and $a=r_{core}$. This algorithm can be applied to all the dopants being considered in the particular design. Once the continuity constraint parameter $\mu$ is chosen for each dopant, then the analytical procedure reverts to the co-doping design; that is, equations (8)-(9) are set up as part of an optimization code; the continuity constraint of equation (12) is also incorporated into the code. Then the optimization code is run to determine the dopant concentration profiles, and hence the fiber design.

In addition to the continuity constraint, additional constraints that encapsulate various process issues into the optimization procedure can be included. Examples include limits on specific dopant concentrations to address attenuation problems and/or viscosity mismatch issues.

Manufacturing/Fabrication Process

Before discussing several exemplary embodiments of the invention in detail, it will be instructive to turn to FIG. 12, which depicts a design and fabrication system 12 for producing MMF preforms 12.5 and/or MMF optical fibers 12.6 in accordance with the invention. More specifically, various design and performance characteristics are typically known a priori, and these are provided as inputs to a computer (or computer system) 12.1. Illustrative performance characteristic inputs 12.11 include either (or both) effective mode bandwidth (EMBc) and differential modal delay (DMD). Design inputs include the numerical aperture (NA) 12.12 and the bandwidth ($\Lambda$) 12.13 for the particular application of the MMF. Other design inputs include dopant data 12.14 associated with doping various regions of the fiber; that is, the kind of dopant (e.g., Ge, P, Al and/or their oxides, as well as F), the relationship between the refractive index and the dopant, and the region to be doped (e.g., the core, trench, inner cladding and/or outer cladding regions). Finally, any structural features 12.15 (e.g., a cladding feature such as a trench) are also inputted to the computer 12.1, which processes all these inputs in accordance with equations (7)-(9), as described previously.

The output of the computer computation is a set of dopant concentration profiles 12.16 (one profile for each dopant inputted to the computer 12.1). These profiles serve as inputs to a controller 12.2, which in turn controls a deposition system 12.3 (e.g., an MCVD system); that is, a multiplicity of glass layers are deposited on a suitable substrate, and each of these layers is doped (or not doped) in accordance with dopant profiles 12.16 to produce a MMF preform 12.5. Illustratively, the glass layers are deposited by MCVD inside an undoped glass substrate tube. The as-deposited tube is then collapsed to form a solid core rod. Then, the core rod is further overclad by placing the core rod inside another overclad tube. Heat and vacuum are used to fuse the core rod and the overclad tube together to form a larger preform. Illustratively, both the substrate tube and the overclad tube have the same index.

Alternatively, the overclad process can also be performed simultaneously with the fiber drawing process. In the overclad-during-draw (ODD) process, the core rod is placed inside an overclad tube, and both are fused together as they are drawn into a fiber.

In the case of ODD of bend-insensitive fiber, the core rod is placed inside an F-doped inner tube and another undoped silica outer jacket tube. After fiber draw, the Ge—P—F core is located inside the undoped silica [substrate] cladding, which is surrounded by the F-doped inner cladding and then the undoped outer cladding. The F-doped inner tube has a lower refractive index than both the substrate and the outer jacket tubes.

In any case, the preform may be an intermediate product in and of itself, or it may serve as the "input" to a draw tower, which in standard fashion draws the preform into a MMF 12.6.

Design Procedure

The design process programmed into computer 12.1 follows, in general, the step-by-step procedure described below. Although the procedure describes the design of a MMF having a down-doped cladding region 10.4 (FIG. 1A), it is equally applicable in principle to the design of other MMFs, such as those having an up-doped outer cladding region, or an undoped outer cladding region, or a trench region. [The phrase down-doped cladding region, or simply down-doped MMF, means the refractive index of the entire cladding region (both the inner and outer cladding regions) is below that of pure silica.]

STEP 1: The following quantities are known a priori:
  a. The design wavelength $\lambda_d$ at which the fiber delta $\Delta=(n_{core}^2-n_{clad}^2)/(2n_{core}^2)$ is specified, where $n_{core}$ and $n_{clad}$ are the refractive indices of the core region at the fiber axis 10.5 (FIGS. 1A & 1B) and at the core-cladding interface 10.6, respectively.
  b. The cladding index difference is given as $\Delta n_{clad} = n_{clad} - n_s$ where $n_{clad}$ is the refractive index of the cladding region and $n_s$ is the refractive index of pure silica at the wavelength $\lambda_d$. Note, $n_{clad}$ can be higher or lower than $n_s$, or equal to it.
  c. The lower and upper limits $(\lambda_L, \lambda_U)$ of the wavelength window over which a broadband MMF is to be designed.
  d. Assume that the square of the refractive index is proportional to the dopant concentration; i.e., $$X_i = \frac{n_i^2(\lambda_d) - n_s^2(\lambda_d)}{n_{i,R}^2(\lambda_d) - n_s^2(\lambda_d)} = \frac{z_i(\lambda_d) - z_s(\lambda_d)}{\sigma_i}; \quad (12a)$$

$$\sigma_i = z_{i,R}(\lambda_d) - z_s(\lambda_d)$$

where $X_i$ is the $i^{th}$ dopant's concentration expressed in mole fractions, $n_{i,R}(\lambda_d)$ is the refractive index with only the dopant (no silica) and $n_i(\lambda_d)$ is the desired refractive index after doping pure silica with this particular dopant. Similarly, $z_{i,R}(\lambda_d)$ is z with only the dopant (no silica), $z_i(\lambda_d)$ is the desired z after doping pure silica with this particular dopant, and $z_s(\lambda_d)$ is z of pure silica. However, when the square of the refractive index is not strictly proportional to the dopant concentration, one can still use this methodology to calculate the required refractive index induced by a given dopant and then calculate the required dopant concentration based on experimental data.
  e. Choose the concentrations of all the dopants except $GeO_2$ on the fiber axis. Well known maximum limits based on manufacturability are used to estimate these dopant concentrations. Later the design will be iterated over different values of these dopant concentrations.

STEP 2: Determine the dopant concentrations at the fiber axis and within the cladding region:
  a. From $\Delta n_{clad}$, determine the fluorine concentration in the cladding region, $X_{F,clad}$, as follows:

$$n_{clad} = \Delta n_{clad} + n_s \quad (13)$$

$$X_{F,clad} = \frac{z_{clad}(\lambda_d) - z_s(\lambda_d)}{\sigma_F} \quad (14)$$

b. From $\Delta$, determine the dopant concentrations on the fiber axis as follows:

$$n_{core}^2 = \frac{n_{clad}^2}{1 - 2\Delta} \quad (15)$$

$$X_{Ge,core} = \frac{z_{core} - z_s - \Sigma_{i \neq GeO_2} \sigma_i X_{i,core}}{\sigma_{Ge}} \quad (16)$$

STEP 3: Choose the optimization tolerance parameter $\epsilon_p$ from:

$$e_{p,L}=a_1(\lambda_d-\lambda_L)+a_0; \epsilon_{p,U}=a_1(\lambda_d-\lambda_U)+a_0 \quad (17)$$

$$\epsilon_p=\min(|\epsilon_{p,L}|,|\epsilon_{p,U}|) \quad (18)$$

where $0 \leq a_1 \leq 0.0025$, $5 \leq a_0 \leq 0.05$.

STEP 4: Set up the following optimization problem:

$$\max_{\lambda \in (\lambda_L, \lambda_U)} \left| \frac{z(r,\lambda) - z_{clad}(\lambda)}{z(r,\lambda_d) - z_{clad}(\lambda_d)} - 1 \right| \leq \epsilon_p \quad (19)$$

Equivalently, $$\max_{\lambda} \left| \frac{\Sigma_i e_i(\lambda) X_i(r) - e_F(\lambda) X_{F,clad}}{\Sigma_i e_i(\lambda)_d X_i(r) - e_F(\lambda_d) X_{F,clad}} - 1 \right| \leq \epsilon_p \quad (20)$$

such that dopant concentration limits are satisfied:

$$X_{i,L} \leq X_i(r) \leq X_{i,U} \quad (21)$$

and dopant concentration continuity constraints are satisfied:

$$\left| \frac{dX_i(r)}{dr} \right| \leq \mu_i; \mu_i = \gamma \left| \frac{X_{i,0} - X_{i,a}}{a} \right|; 0.5 \leq \gamma \leq 2.5 \quad (22)$$

where $X_{i,L}$ and $X_{i,U}$ are the lower and upper bounds on the dopant concentrations, $X_{i,0}$ is the dopant concentration at the fiber axis, and $X_{i,a}$ is the dopant concentration at the core/cladding interface and a is the fiber core radius.

STEP 5: The optimization problem in step 4 is solved numerically in computer 12.1.

STEP 6: Iterate the design over input parameters defined in step 1.

Reduction of Material Dispersion to Increase Spectral Width

In the examples that follow, illustrative broadband silica MMF designs in accordance with the invention are configured to reduce material dispersion contributions on major (or principal) mode groups in order to increase the spectral width of the fiber.

Example (a)

Ge—P—F— Core within a Low Index Jacket Tube

This example describes the design of a broadband silica MMF wherein the core region is doped with Ge, P and F. The core region is deposited inside a low index silica jacket tube, which is then collapsed to form a core rod.

CWDM-optimized MMF fiber preforms are made by depositing Ge—P—F doped silica inside a low index substrate tube that is subsequently overclad with another low index overclad jacket. Specific concentrations of Ge, P and F-dopants are deposited at different core radial positions. The dopant types and concentrations are chosen to maximize the material contributions of P-doped and F-doped silica to increase the spectral width of the high bandwidth wavelength range for CWDM-optimized MMF operation. Specifically, more principal mode groups (PMGs) will be guided in the radial regions primarily doped with P and F and fewer PMGs will be guided in the Ge-doped region; i.e., in the section of the core region of FIG. 7A between zero and approximately 14 µm.

Low index substrate and overclad jacket tubes permit lower concentrations of Ge and P dopants to be used while maintaining a similar index profile as in a conventional MMF. The lower Ge-dopant concentration reduces its material dispersion contributions, which narrow the MMF spectral width. Furthermore, a significant radial portion (i.e., the radial section between approximately 14 µm and 25 µm, FIGS. 7B & 7C) of the index profile is made exclusively by the P-dopant or F-dopant, which have low material dispersions.

The lower P-dopant concentration reduces the induced attenuation when the fiber is exposed to either hydrogen or radiation.

FIG. 6 shows the total (or composite) index profile of an inventive CWDM-optimized MMF having 0.2 NA and 50 µm core diameter. The MMF was made inside a low index silica jacket with −0.0055 DN. (DN is a symbol denoting the index contrast Δn.) Either a F-doped or B-doped, or F and B co-doped, jacket tube can be used for this embodiment of the invention. A F-doped jacket tube is preferred since its thermal expansion coefficient is more compatible with the G-P—F doped silica core region. However, jacket tubes having different indices between −0.0012 DN and −0.015 DN can be used.

Table 2 shows the dopant types in different radial positions corresponding to the MMF index profile shown in FIG. 6. Inner and outer radial positions are given for the distribution of different dopants together with their approximate distribution profiles.

TABLE 2

| MCVD Dopant | Distribution | Inner Radius (micron) | Outer Radius (micron) |
|---|---|---|---|
| Ge | Graded | 0 | 14.1 |
| P | Uniform | 0 | 14.1 |
| P | Near linear | 14.1 | 19.5 |
| F | Near linear | 19.5 | 25 |

The index profiles resulting from these three dopants are shown in FIGS. 7A, 7B & 7C. In Table 2, the Ge-dopant concentration profile is said to be graded; in fact, the grading is parabolic. The MMF target index profile is the composite of these profiles. In addition, the phrase near linear is used to characterize the P- and F-dopant concentration profiles. The term near is not quantified but is not critical and is well understood by those skilled in the art. Moreover, it would suffice from a design standpoint to know that these profiles are monotonically decreasing with increasing fiber position (radius).

FIG. 7A shows the index profile formed by the Ge-dopant in the core region of the inventive CWDM-optimized MMF. The Ge-dopant contributes to a maximum of 0.0048 DN, which is advantageously about 3 times less than that in the conventional MMF. Another advantageous feature: the Ge-dopant is confined to within approximately 14.1 µm radius versus 25 µm in a conventional MMF. These features have an important impact on bandwidth; that is, since the Ge dopant has a much higher material dispersion than the P-dopant and the F-dopant, the smaller Ge-dopant contribution together with the larger contributions from the P-dopant and F-dopant result in a much wider spectral width in the inventive CWDM-optimized MMF.

FIG. 7B shows the index profile formed by the P-dopant in the core region of the inventive CWDM optimized MMF. The P-dopant contributes to 0.004 DN maximum index within approximately 14.1 µm of the core region to reduce attenuation induced by hydrogen or radiation. Furthermore, the P-dopant decreases rapidly between approximately 14.1 and 19.5 µm.

FIG. 7C shows the shows the index profile formed by the F-dopant in the core region of the inventive CWDM-optimized MMF. The F-dopant contributes to the index profile between approximately 19.5 µm and 25 µm and has 0.0055 DN maximum index magnitude, matching the F-doped jacket tube at 25 µm radial position.

A MMF typically has a large number of propagation modes (e.g., 100's of modes). Many of these modes having very similar effective indices are grouped together forming principal mode groups (PMGs). Each MMF has a multiplicity of PMGs, and each PMG includes a multiplicity of modes. For example, a MMF with 0.2 NA and 50 µm core diameter has 19 PMGs, and each PMG contains several modes that have very similar effective indices. FIG. 8 shows the effective index difference of the several PMGs corresponding to the index profile of the MMF described above.

In addition, the effective index of the different mode groups can be evaluated and correlated with a radial position corresponding to the refractive index profile. The radial position can, in turn, be correlated with particular dopant contribution. For example, the $n_{eff}$ in PMG-1 is $7.21 \times 10^{-3}$ above silica, and this $n_{eff}$ corresponds to 7.35 µm radial position in the MMF index profile. The $n_{eff}$ in PMG-5 is $4.29 \times 10^{-3}$ above silica corresponding to 13.65 µm fiber radial position. The $n_{eff}$ and corresponding fiber radial positions for different PMG are shown in Table 3. The $4^{th}$, $5^{th}$ and $6^{th}$ columns show the index contributions, expressed in DN, by Ge-, P- and F-dopants, respectively. The last 3 columns show the percentage index contributions from these dopants.

In a conventional MMF, all mode groups are supported by the higher index from the Ge-dopant. In the inventive CWDM-optimized MMF, Ge-dopant advantageously contributes to only 45% of the PMG-1 and only 7% in PMG-5. The Ge-dopant does not have any contributions to PMG-6 through PMG-19. The P-dopant contributes to 55% of the PMG-1 and has even higher contributions to PMG-4 through PMG-10. The contributions to higher PMGs from PMG-11 through PMG-19 are due to the F-dopant exclusively. Since the Go-dopant has a much higher material dispersion than P- and F-dopants, the smaller Ge-dopant contribution together with the larger contributions from the P- and F-dopants result in a much wider spectral width in the inventive CWDM-optimized MMF.

TABLE 3

| PMG | Neff −0.0055 | Radius (um) | DN contribution from dopants | | | % contribution from dopants | | |
|---|---|---|---|---|---|---|---|---|
| | | | Ge | P | F | Ge | P | F |
| 1 | 7.21E−03 | 7.35 | 3.21E−03 | 0.004 | 0 | 44.6% | 55.4% | 0 |
| 4 | 5.03E−03 | 12.35 | 0.00103 | 0.004 | 0 | 20.5% | 79.6% | 0 |
| 5 | 4.29E−03 | 13.65 | 0.00029 | 0.004 | 0 | 6.8% | 93.1% | 0 |
| 6 | 3.56E−03 | 14.80 | 0 | 0.003563 | 0 | 0 | 100% | 0 |
| 8 | 2.10E−03 | 16.85 | 0 | 0.0021 | 0 | 0 | 100% | 0 |
| 10 | 6.31E−04 | 18.70 | 0 | 0.000631 | 0 | 0 | 100% | 0 |
| 11 | −1.03E−04 | 19.60 | 0 | 0 | −0.0001 | 0 | 0 | 100% |
| 14 | −2.31E−03 | 21.95 | 0 | 0 | −0.00231 | 0 | 0 | 100% |
| 19 | −5.53E−03 | 24.95 | 0 | 0 | −0.00553 | 0 | 0 | 100% |

While the MMF of Example (a) was made in low index tube having −0.0055 DN, other CWDM-optimized MMF designs can be made with tubes having index between 0.000 DN and −0.015 DN.

Example (b)

Ge—F Core within a Low Index Jacket Tube

This example describes the design of a broadband silica MMF wherein the core region is doped with Ge and F. The core region is formed inside a low index (−0.010 DN) silica jacket tube, which is then collapsed to form a core rod.

CWDM-optimized MMF is also made with Ge—F core region deposited inside a low index jacket as illustrated by the index profile shown in FIG. 9A. The index profiles formed by the Ge-dopant and F-dopant are shown in FIG. 9B and FIG. 9C, respectively. Ge-doped silica contributed to the first 4 PMGs but advantageously at much lower Ge-concentrations than those in a conventional MMF at the corresponding mode groups. Signals in mode groups PMG-5 through PMG-19 propagate only in the F-doped silica, which has a much smaller material dispersion. This design results in a wider spectral width suitable for CDWM applications. Table 4A shows the Ge-dopant concentration (mole %) in the waveguide regions supporting the first 4 mode groups. (Table 4B shows the corresponding Ge-indices.) In this CWDM-optimized design, the first 4 mode groups advantageously propagate in the radial regions containing about $\frac{1}{5}^{th}$ to $\frac{1}{20}^{th}$ of the Ge-concentrations compared to those in a conventional MMF, which results in a wider spectral width because of the smaller material dispersion from the Ge-dopant. The higher order mode groups are supported by the F-doped regions in this inventive MMF design. The Ge-concentrations were estimated by assuming that silica doped with 10 mole % GeO$_2$ has an index about 0.0146 DN above that of silica. (However, this assumption is not critical.)

TABLE 4A

| PMG | CWDM*-optimized Ge (Mole %) | Conventional Ge (Mole %) |
|---|---|---|
| 1 | 1.86 | 8.7 |
| 2 | 1.36 | 8.2 |
| 3 | 0.86 | 7.7 |
| 4 | 0.36 | 7.2 |

*made with −0.010 DN jacket tube

TABLE 4B

| PMG | CWDM*-optimized Ge-index [DN] | Conventional Ge-index [DN] |
|---|---|---|
| 1 | 2.72E−03 | 1.27E−02 |
| 2 | 1.99E−03 | 1.20E−02 |
| 3 | 1.26E−03 | 1.13E−02 |
| 4 | 5.26E−04 | 1.05E−02 |

*made with −0.010 DN jacket tube

Example (c)

Reduction of Viscosity Mismatch Across the Core

In the fiber index profile shown in FIG. 9A the middle section of the core region, around the 13.2 μm radial position, has a net zero index difference. Being nearly devoid of any significant amount of dopant, either Ge or F, this region has viscosity substantially higher than the surrounding regions that contain significant dopant concentrations. The high viscosity region, sandwiched between relatively lower viscosity regions, buckles and deforms during preform collapse. Furthermore, the significant viscosity mismatch in the middle of the core region also increases fiber attenuation.

Since P-dopant substantially reduces the viscosity of silica, introducing a small P-dopant concentration around the near-zero index region reduces the viscosity mismatch. Near zero index is between ±0.001 DN, which corresponds to a radial region of about 10 μm to 15.6 μm.

FIGS. 10A and 10B show examples of the inventive CWDM-optimized MMF designs with a substantial reduction in the viscosity mismatch attained by P-dopant addition in the near-zero index region and an excess F-dopant introduced to maintain the target CWDM-optimized index profile. FIG. 10A shows the step profiles of P- and F-dopant profiles, and FIG. 10B shows the graded profiles of these dopants. The graded profiles can be achieved by radial variations of chemical doping during preform processing together with thermal diffusion during fiber draw.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the design framework of the present invention may also be applied to co-doped, few-moded optical fibers for potential use in WDM or DWDM (dense WDM) long-haul systems. Moreover, the invention may also be configured to address bend loss problems and/or hydrogen sensitivity problems, as described below.

Bend-Optimized and CWDM-Optimized MMF

CWDM-optimized MMFs can be made bend-optimized by introducing a trench in the cladding region (typically the inner cladding region) as exemplified by the index profile shown in FIG. 11. As known in the prior art, the position, width and index depth of the trench can be chosen to preserve the bandwidth in the bent fiber and also reduce the bend-induced attenuation. Since the trench serves to preserve the modal structures in the bent fiber, the addition of the trench does not degrade the large spectral width for CWDM applications.

Reduction of Hydrogen Sensitivity

To further reduce the hydrogen-induced attenuation, a hermetic coating may be applied to the inventive CWDM-optimized MMF to slow the hydrogen diffusion rate. The hermetic coating is illustratively made of carbon, metals or silicon nitride.

Furthermore, hydrogen-getter layers may be introduced in the outer clad region. The hydrogen-getter layers may be made of Ge-doped or P-doped silica, which have a high reactivity with hydrogen. When exposed to hydrogen, the diffusing hydrogen molecules react with the getter layer and become immobilized. Since the reacted hydrogen molecules remain far from the core region, they do not induce significant attenuation of the propagating light signals. Additionally, hydrogen sensitivity can be reduced by passivating the fiber after fiber draw using a number of well-known processes. All of these sensitivity reduction methods can be applied individually or in combination with one another.

What is claimed is:

1. A broadband multimode optical fiber comprising:
   a core region having a transverse cross-section and a longitudinal axis, said core region being configured for broadband operation at wavelengths $\lambda$ within a predetermined wavelength range, $\Lambda$, and
   a cladding region surrounding said core region,
   said core and cladding regions being configured to support the propagation of optical radiation in said core region and along said axis simultaneously in a plurality of transverse modes,
   said core region being co-doped with a plurality of dopants, the concentrations and distributions of said dopants being radially varied within said transverse cross-section of said core region so that the refractive index of said core region is radially graded and so that variations in $z(r, \lambda)$ with respect to wavelength are reduced, where $z(r,\lambda) \triangleq n^2(r,\lambda)k_0^2$, r is radius, $\lambda$ is the wavelength of said optical radiation, n is the refractive index of said core region, $k_0 = 2\pi/\lambda$ is the wave number, and wherein said concentrations and distribution of said dopants are also radially varied within said transverse cross-section of said core region so that $$\left| \frac{d[z(r, \lambda) - z_{cl}(\lambda)]}{d\lambda} \right| \leq \epsilon_1 \text{ for } \lambda \in \Lambda$$

where $z_{cl}(\lambda)$ is z of said cladding region, and $\epsilon_1$ is a tolerance factor that is chosen such that said fiber has a desired transmission and bandwidth performance within said operating wavelength range, $\lambda$.

2. The fiber of claim 1, wherein said concentrations and distribution of said dopants are radially varied within the transverse cross-section of said core region so that $$\underset{\lambda \in \Lambda}{\text{maximum}} |[z(r, \lambda) - z_{cl}(\lambda)] - e_d| \leq \epsilon_2$$

where $e_d = z(r, \lambda_d) - z_{cl}(\lambda_d)$ and the design wavelength $\lambda_d \in \Lambda$ and $\epsilon_2$ is a tolerance factor that is chosen such that said fiber has a desired transmission and bandwidth performance within said operating wavelength range, $\Lambda$.

3. The fiber of claim 2, wherein said concentrations and distribution of said dopants are radially varied within the transverse cross-section of said core region so that $$\underset{\lambda \in \Lambda}{\text{maximum}} \left| \frac{[z(r, \lambda) - z_{cl}(\lambda)]}{e_d} - 1 \right| \leq \epsilon_\rho$$

where $\epsilon_p$ is an optimization tolerance parameter, such that $\epsilon_p = \epsilon_2/e_d$.

4. The fiber of claim 3, wherein, for a design wavelength window having a lower wavelength bound of $\lambda_L$ and an upper wavelength bound of $\lambda_U$, said concentrations and distribution of said dopants are radially varied within the transverse cross-section of said core region so that $\epsilon_{p,L} = a_1(\lambda_d - \lambda_L) + a_0; \epsilon_{p,U} = a_1(\lambda_d - \lambda_U) + a_0$ $\epsilon_p = \min(|\epsilon_{p,L}|, |\epsilon_{p,U}|)$ where $0 \leq a_1 \leq 0.0025$, $0 \leq a_0 \leq 0.05$, and where $\lambda_d$ is a design wavelength within said window.

5. The fiber of claim 1, wherein the concentration of each of said dopants is represented by a radial concentration profile, and the maximum slope of said concentration profile of each of said dopants satisfies $$\left| \frac{dX_d(r)}{dr} \right| \leq \mu \text{ for } r \in \mathbb{R}$$

where $X_d(r)$ is the dopant concentration at a radius r, R is the range of radii being considered, and $\mu$ is given by $\mu = \gamma[(X_{d_o} - X_{d_a})/a]$, $\gamma = 0.5$-$2.5$, where $X_{d_o}$ is the dopant concentration at r=0, and $X_{d_a}$ is the dopant concentration at r=a.

6. The fiber of claim 1, wherein
   said fiber comprises silica and is designed for operation in a CWDM system and has an NA~0.2,
   said core region is co-doped with Ge, P and F, has a parabolic index profile with $\alpha = 2.08 \pm 0.1$, and has a diameter of 50 µm approximately, the index profile of said Ge-dopant is graded from a maximum at said axis to zero at a radius of approximately 14 μm, the index profile of said P-dopant is essentially uniform from said axis to a radius of approximately 14 μm and thereafter is graded to zero at a radius of approximately 19 μm, and the index profile of said F dopant is essentially uniform from said axis to a radius of approximately 19 μm and thereafter is graded to zero at a radius of approximately 25 μm.

7. The fiber of claim 1, wherein said fiber comprises silica and is designed for operation in a CWDM system and has an NA~0.2, said core region is co-doped with Ge and F, has a parabolic index profile with α=2.0±0.1, and has a diameter of 50 μm approximately, the index profile of said Ge-dopant is graded from a maximum at said axis to zero at a radius of approximately 13 μm, and the index profile of said F-dopant is essentially uniform from said axis to a radius of approximately 13 μm and thereafter is graded to zero at a radius of approximately 25 μm.

8. The fiber of claim 7, wherein said index profile of said fiber has an essentially net zero index difference in a radial section between approximately 10-15 μm, said region having a higher silica viscosity than regions surrounding said section, and wherein said section is doped with P to reduce its viscosity.

9. The fiber of claim 1, wherein said concentrations and distributions of said dopants are radially varied within said transverse cross-section of said core region so that said variations in $z(r, \lambda)$ with respect to wavelength are minimized.

10. A method of fabricating an optical fiber comprising the steps of:
   (a) determining desired performance characteristics of the fiber, including at least a core region, an inner cladding region and an outer cladding region,
   (b) determining desired structural characteristics of the fiber,
   (c) determining the numerical aperture and bandwidth of the fiber,
   (d) determining the dopants that will be incorporated into the core region of the fiber,
   (e) setting up a numerical optimization code to generate the dopant concentration profiles of each of said dopants by reducing the variation of $z(r, \lambda)$ with respect to wavelength, where $z(r, \lambda) \triangleq n^2(r, \lambda) k_0^2$, r is radius, λ is wavelength, n is the refractive index of the core region, and $k_0 = 2\pi/\lambda$ is the wave number, and
   (f) providing the dopant concentration profiles to a deposition system that produces an optical fiber preform in which the concentration of each dopant in its core region corresponds to the inputted profiles.

11. The method of claim 10 further including the step of drawing an optical fiber from the preform.

12. The method of claim 10 wherein, in step (e), the variation of $z(r, \lambda)$ with respect to wavelength is reduced as follows:

$$\left| \frac{d[z(r, \lambda) - z_{cl}(\lambda)]}{d\lambda} \right| \leq \epsilon_1 \text{ for } \lambda \in \Lambda$$

where Λ is the desired bandwidth, $z_{cl}(\lambda)$ is z of the inner cladding region, and $\epsilon_1$ is a tolerance factor that is chosen such that the fiber has a desired transmission and bandwidth performance within said operating wavelength range, Λ.

13. The method of claim 12, wherein the reducing step is a min-max operation as follows:

$$\underset{\lambda \in \Lambda}{\text{maximum}} |[z(r, \lambda) - z_{cl}(\lambda)] - e_d| \leq \epsilon_2$$

where $e_d = z(r, \lambda_d) - z_{cl}(\lambda_d)$, the design wavelength $\lambda_d \in \Lambda$, and $\epsilon_2$ is a tolerance factor that is chosen such that the fiber has a desired transmission and bandwidth performance within said operating wavelength range, λ.

14. The method of claim 13, wherein the reducing step is a min-max operation as follows:

$$\underset{\lambda \in \Lambda}{\max} \left| \frac{[z(r, \lambda) - z_{cl}(\lambda)]}{e_d} - 1 \right| \leq \epsilon_p$$

where $\epsilon_p$ is an optimization tolerance parameter, such that $\epsilon_p = \epsilon_2/e_d$.

15. The method of claim 10, wherein step (e) includes setting up a numerical optimization code to generate the dopant concentration profiles of each of said dopants by minimizing the variation of $z(r, \lambda)$ with respect to wavelength.

16. The method of claim 11 wherein the fiber is a multimode fiber suitable for use in a CWDM system.

* * * * *